United States Patent
Tu

Patent Number: 5,841,902
Date of Patent: Nov. 24, 1998

[54] SYSTEM AND METHOD FOR UNCONSTRAINED ON-LINE ALPHA-NUMERICAL HANDWRITING RECOGNITION

[75] Inventor: Lo-Ting Tu, Taipei, Taiwan

[73] Assignee: Industrial Technology Research Institute, Hsinchu, Taiwan

[21] Appl. No.: 725,345

[22] Filed: Oct. 1, 1996

Related U.S. Application Data

[63] Continuation of Ser. No. 313,686, Sep. 27, 1994, abandoned.

[51] Int. Cl.⁶ .............................. G06K 9/00; G06K 9/46; G06K 9/66; G06K 9/68

[52] U.S. Cl. ........................ 382/187; 382/190; 382/193; 382/225

[58] Field of Search ................................... 382/187, 190, 382/192, 193, 224, 225

[56] References Cited

U.S. PATENT DOCUMENTS

| | | | |
|---|---|---|---|
| 3,979,722 | 9/1976 | Sakoe | 340/164.3 |
| 4,284,975 | 8/1981 | Odaka | 340/146.3 |
| 4,658,429 | 4/1987 | Orita et al. | 382/224 |
| 4,685,142 | 8/1987 | Ooi et al. | 382/13 |
| 4,718,103 | 1/1988 | Shojima et al. | 382/13 |
| 4,731,857 | 3/1988 | Tappert | 382/9 |
| 4,773,099 | 9/1988 | Bokser | 382/225 |
| 4,903,312 | 2/1990 | Sato | 382/21 |
| 5,034,989 | 7/1991 | Loh | 382/13 |
| 5,050,219 | 9/1991 | Maury | 382/3 |
| 5,151,950 | 9/1992 | Hullender | 382/13 |
| 5,481,718 | 1/1996 | Ryu et al. | 395/700 |

OTHER PUBLICATIONS

D. Lee & N. Srihari, *Handprinted Digital Recognition: A Comparison of Algorithms* Third International Workshop on Frontiers in Handwriting Recognition pp. 153–162 (1993).

G. Srikantan, *Gradient Represntation for Handwritten Character Recognition* Third International Workshop on Frontiers in Handwriting Recognition pp. 318–323 (1993).

L. Tu, W. Lin, Y. Chan & I. Shyu, *A PC Based Handwritten Chinese Character Recognition System* Third International Workshop on Frontiers in Handwriting Recognition pp. 349–354 (1993).

Devuer & Kittler, *Pattern Recognition: A Statistical Approach* p. 409 (1982).

*Primary Examiner*—Andrew W. Johns
*Assistant Examiner*—Monica S. Davis
*Attorney, Agent, or Firm*—Meltzer, Lippe, Goldstein, Wolf & Schlissel, P.C.

[57] ABSTRACT

A character recognition system includes a character input device, such as a stylus and tablet or optical scanner, for receiving inputted characters, and a processor. The processor determines which of a number of model characters best matches the inputted character. To that end, the processor compares each inputted character to each of a plurality of classes into which the model characters are organized. Specifically, the processor extracts a feature value vector from the inputted character, and compares it to the mean feature value vector of each class. The processor recognizes the inputted character as the model character corresponding to the mean feature value vector which is closest to the feature value vector of the inputted character. The processor also constructs the database from multiple specimens of each model character. The processor organizes the specimens of each model character into multiple classes. The processor then determines the mean feature value vector of each class.

27 Claims, 20 Drawing Sheets

SYSTEM AND METHOD FOR UNCONSTRAINED ON-LINE ALPHA-NUMERICAL HANDWRITING RECOGNITION

This application is a continuation of application Ser. No. 08/313,686 filed Sep. 17, 1994, now abandoned.

FIELD OF THE INVENTION

The present invention relates to character recognition. In particular, the present invention relates to a recognition system and method which are fast enough to recognize handwritten characters (as well as machine printed characters) on-line, i.e., as the characters to be recognized are handwritten.

BACKGROUND OF THE INVENTION

Character recognition is often used to input information which is in a humanly readable form (i.e., machine printed or handwritten form) rather than in electronic digital form. For instance, while many computer systems have a keyboard for receiving keypunch input, other computer systems have an optical scanner for receiving documentary input. Yet other computer systems have a pen-like stylus and tablet digitizer for receiving handwriting input. Such handwriting input devices may be provided for a number of reasons. For example, many users are more accustomed to inputting data via handwriting as opposed to keypunch. Additionally, a keyboard requires a large amount of space which cannot be accommodated in a small portable computer such as a personal digital assistant or PDA.

FIG. 1 shows a conventional handwriting character recognition system 10. The handwriting recognition system includes a tablet and stylus 12 for receiving handwritten input. The user moves the stylus about the tablet surface. The stylus and tablet 12 convert the user's movement of the stylus with respect to the tablet into digital binary data which graphically represent the movement. That is, if a user had used a pen and paper, the movement of the pen would have created lines on the paper. The stylus and tablet produce pixellated images of such lines in the form of digital data.

The stylus and tablet 12 transfer the data to an interface 14. The interface 14, in turn, transfers the data onto the system bus 16. The handwriting recognition system 10 includes a processor or CPU 22, a main memory 18, a disk memory 20 and an audio/video output device 24 such as a cathode ray tube and loudspeakers. Each of these devices 18, 20, 22 and 24 is connected to the system bus 16 for purposes of transferring data to, and receiving data from, one of the other devices or the interface 14. The audio/video output device 24 is for conveying information to a user, in the form of images and sounds. The main memory 18 and disk memory 20 are for storing data and programs. The CPU 22 is for processing data. In particular, the CPU 22 executes steps in conjunction with the other devices 12, 14, 16, 18, 20 and 24 for recognizing characters from the inputted handwritten character data.

FIG. 2 illustrates another character recognition system 10' with an architecture that is similar to the system 10 of FIG. 1. However, an optical scanner 13' is provided in place of a stylus and tablet 12 (FIG. 1). Documents may be fed into the optical scanner which generates pixellated images of the characters thereon in the form of digital data.

FIG. 3 illustrates a conventional handwriting character recognition process which may be executed by the handwriting recognition system 10 of FIG. 1. In a first step 32, the inputted handwriting data may be received. For instance, using the stylus and tablet 12 (FIG. 1), the user writes one or more characters. The stylus and tablet 12 (FIG. 1) transfer character data which graphically represents the written characters to the interface 14 (FIG. 1). The interface 14 (FIG. 1) transfers the inputted character data via the system bus 16 (FIG. 1) to, for example, the main memory 18 (FIG. 1). Next in step 34, the CPU 22 pre-processes the inputted character data in the main memory 18 (FIG. 1). For instance, the CPU 22 (FIG. 1) may remove noise by discarding clusters of connected pixels having less than a minimum threshold area. The CPU 22 (FIG. 1) may also smooth the graphical images of the inputted characters. Next in step 36, the CPU 22 (FIG. 1) optionally forms a skeleton image of the characters and then converts the skeleton images to enlarged contoured images (i.e., thickens the lines of the skeleton images). In step 38, the CPU 22 (FIG. 1) segments the images of the characters (i.e., divides the images into sub-images) which segmentation depends on the features to be extracted. Next in step 40, the CPU 22 (FIG. 1) extracts feature values of the characters. (Herein features means any quantifiable graphical characteristics of an image which are useful for distinguishing the image of one or more characters from others.) In step 42, the CPU 22 compares the extracted feature values with corresponding feature values of model characters, which can be recognized by the handwriting character recognition system 10, of a character recognition database. The character recognition database is illustratively stored in the disk memory 20 (FIG. 1). Based on the comparisons performed in step 42, the CPU 22 determines which model character of the character recognition database best matches the image of the handwritten character. In step 44, the CPU 20 (FIG. 1) outputs the best matching model character.

The handwriting character recognition process of FIG. 3 is rather abstract and basic. Many modifications and enhancements have been proposed for recognizing machine printed and handwritten characters. See U.S. Pat. Nos. 5,151,950, 5,050,219, 5,034,989, 4,903,312, 4,731,857, 4,718,103, 4,685,142 and 4,284,975 and D. Lee & N. Srihari, *Handprinted Digital Recognition: A Comparison of Algorithms* THIRD INTERNATIONAL WORKSHOP ON FRONTIERS IN HANDWRITING RECOGNITION p. 153–162 (1993), G. Srikantan, *Gradient Representation for Handwritten Character Recognition* THIRD INTERNATIONAL WORKSHOP ON FRONTIERS IN HANDWRITING RECOGNITION p. 318–23 (1993) and L. Tu, W. Lin, Y. Chan & I. Shyu, *A PC Based Handwritten Chinese Character Recognition System* THIRD INTERNATIONAL WORKSHOP ON FRONTIERS IN HANDWRITING RECOGNITION p. 349–54 (1993). Many systems recognize handwritten characters by identifying the strokes which make up each character and by comparing the strokes thus identified to strokes of model characters in a character recognition database. Recognition using individual strokes is quite useful for on-line handwritten character recognition. However, stroke identification often requires that a stylus and tablet input device be used as opposed to an optical scanner so that the CPU 22 (FIG. 1) can clearly determine which pixels belong to each stroke. Thus, stroke detection is not used for off-line handwritten recognition or for machine printed character recognition.

Some of the above references disclose systems which do not use stroke detection/recognition. Rather, these references disclose systems which extract contour feature values from the pixellated image of the character itself. Such systems can therefore be used for off-line handwriting recognition and machine printed character recognition. In particular, U.S. Pat. No. 4,903,312 (Sato) discloses a character recognition system wherein each inputted character image is contained within a bounding rectangular array of pixels 50, such as is shown in FIG. 4. The inputted character image is segmented into smaller rectangles 51–66 called zones as shown in FIG. 5. According to this reference, the division of the bounding rectangle into zones 51–66 is variable. That is, the location of the dividing lines between segmented zones 51–66 is determined based on the distribution of the pixels of the character within the bounding rectangle.

In a typical character recognition system, a character recognition database of model characters, against which the inputted characters are compared, must be constructed prior to performing the recognition. The character recognition databases may be organized in a number of ways. For instance, U.S. Pat. No. 5,050,219 (Maury) teaches a character recognition database organized according to a tree structure. Each leaf node of the tree contains a character which can be recognized. Each non-leaf node of the tree contains a particular one of a plurality of predetermined feature comparisons which should be performed on the inputted character feature values. Based on the results of the comparison at such a non-leaf node, the database is traversed to a particular attached child node. In the comparison step, the tree is traversed until a leaf node is reached. The character is then recognized as the character corresponding to the leaf node.

Other character recognition databases are flat. Such character recognition databases contain one set of feature values for each model character to be recognized. The inputted character feature values are compared to each set of feature values. The inputted character is then recognized as the model character corresponding to the set of feature values which best match the feature values of the inputted character.

A flat character recognition database such as used above is conventionally generated as follows. Multiple specimens are inputted to the system 10 of FIG. 1 for each model character which can be recognized. Feature values are then extracted for each model character specimen. For each model character, the feature values are then averaged over all specimens thereof to form one set of mean feature values. That is, suppose L feature values $A_{1p}, A_{2p}, \ldots, A_{Lp}$ are extracted for each $p^{th}$ specimen of a total of P specimens inputted for each model character, where L and P are positive integers and where l and p are indexes from 1 to L and from 1 to P, respectively. Then an $l^{th}$ mean feature value $\hat{A}_l$ for a particular model character is given by:

$$\hat{A}_l = \sum_{p=1}^{P} A_{lp}, \qquad (1)$$

There is a problem with the prior art flat database construction technique which relates to the distribution of the specimen feature value data. Consider the above example, wherein P specimens are provided for a given inputted model character and wherein L feature values are extracted for each feature value. Each $p^{th}$ specimen is therefore represented by a vector of L feature values $A_p$. Such vectors may be plotted in an L-dimension hyperspace. FIG. 6 shows one such graphical plot, wherein each point represents one of the P specimens and wherein each axis corresponds a different one of the L feature values. The graph of FIG. 6 is plotted in two-dimensional space for purposes of demonstrating principles which apply in the general L-dimension hyperspace.

As shown, the specimens are rather non-uniformly distributed. This presents a problem for recognizing characters using a single mean feature value vector. A point 1000 defined by a triangle represents the mean feature value vector over all P specimens. Consider an inputted character with a feature value vector 1010, shown by a star, that falls near a boundary of the distribution of the P specimens. As shown, the inputted character feature value vector 1010 is "distant" from the mean feature value vector 1000. As a result, the prior art technique utilizing a mean feature value vector as formed above will have difficulty recognizing the inputted character as the correct model character.

It is an object of the present invention to overcome the disadvantages of the prior art.

SUMMARY OF THE INVENTION

These and other objects are achieved by the present invention which provides an improved method and system for recognizing characters. According to one embodiment, the character recognition database is generated as follows. Model character specimens are inputted to a character recognition system, e.g., via a character input device such as a stylus and writing tablet or an optical scanner. Using a processor of the character recognition system, the specimens of each model character are classified into multiple classes.

Illustratively, the processor classifies the specimens of each model character as follows. First, using a processor of the character recognition system, the inputted character specimens of a given model character are segmented and feature values are extracted from the segmented model characters. As an initial condition, the processor determines whether or not the number p of specimens not yet classified, i.e., not yet organized into any class, is greater than or equal to a first threshold $p_1$. If so, then the processor determines the center of a new class, for example, by determining the mean of the remaining specimens not yet organized into any class. Next, the processor determines a radius H about the center of the new class. Illustratively, the radius H is a function of the standard deviation of the remaining specimens. For example, assuming there are L total features for each specimen, the following formula may be used for calculating H:

$$H = \sum_{l=1}^{L} V_l, \qquad (2)$$

where $V_l$ is the standard deviation of the $l^{th}$ feature. Thereafter, the processor collects all remaining specimens within the radius H about the new center into the new class. Illustratively, the processor then compares the number of specimens collected into the new class u to a second threshold $P_2$. If the number of specimens u is less than $P_2$, then the new class is too small. In such a case, the processor adjusts, i.e., enlarges, the radius H and recollects remaining feature values into the class. The processor repeats the above classification process (in order to classify the remaining specimens not yet organized into any class) until the number of remaining specimens not yet organized into any class p is less than the first threshold $P_1$. Thereafter, the processor collects any remaining unclassified specimens into the nearest class.

After generating the classes, the processor determines the mean of each class. That is, for each class, the processor determines the mean feature value vector over all specimens in that class. In this fashion, the processor produces multiple mean feature value vectors for each model character. Thereafter, the processor illustratively executes the well known K_means procedure for adjusting the classification by reclassifying specimens located near class boundaries to stabilize the classification for recognition. See DEVIJVER & KITTLER, PATTERN RECOGNITION: A STATISTICAL APPROACH p. 409 (1982).

According to another embodiment of the invention, characters may be recognized as follows. One or more characters are inputted to the character recognition system using, for example, a character input device such as a stylus and tablet or optical scanner. The processor receives data representing the image of each inputted character and segments the received characters. The processor then illustratively extracts feature values from the segmented character data. Thereafter, the processor compares the inputted character to each class of each model character into which the character recognition database is organized. That is, the processor illustratively compares the feature value vector of the inputted character to the mean feature value vectors of each class of model characters in the character recognition database. As noted above, the character recognition database includes multiple classes for each model character. Based on these comparisons, the processor determines the model character that best matches the inputted character. To that end, the processor illustratively determines the class having the mean feature value vector which best matches the feature value vector of the inputted character. Illustratively, the processor evaluates the following discriminant function in comparing the feature value vector of an inputted character to the mean feature value vectors of the model characters stored in the database:

$$Dis(A_q, B_r) = \sum_{l=1}^{L} \left( \frac{A_{ql} - B_{rl}}{S_l} \right)^2, \quad (3)$$

where $$S_l = \frac{1}{C} \sum_{c=1}^{C} V_{lc}$$

and where:
q is an index identifying the inputted character,
r and c are independent indexes identifying particular classes and are defined over the range of 1 . . . C
l is an index identifying a particular feature and is defined over the range of 1 . . . L,
L is the total number of features,
C is the total number of classes over the entire database of model characters,
$A_{ql}$ is an $l^{th}$ feature value for the $q^{th}$ input character,
$B_{rl}$ is an $l^{th}$ mean feature value for the $r^{th}$ class,
$A_q$ is the feature value vector of the $q^{th}$ input character including one feature value $(A_{q1}, A_{q2}, \ldots, A_{qL})$ for each feature 1 to L,
$B_r$ is the mean feature value vector of the $r^{th}$ class including one mean feature value $(B_{r1}, B_{r2}, \ldots, B_{rn})$ for each feature 1 to L,
$V_{lc}$ is the standard deviation of the $l^{th}$ feature in a given $c^{th}$ class, and
$S_l$ is the mean standard deviation for the $l^{th}$ feature over all C classes.

The processor then recognizes the $q^{th}$ inputted character as the model character of the $r^{th}$ class having the mean feature value vector $B_r$ that minimizes the output of the above discriminant function $Dis(A_q, B_r)$.

In short, a system and method are provided which classify the model character specimens of a character recognition database into multiple classes. As a result, the character recognition database better represents the actual non-uniform distribution of the model character specimens. This in turn reduces the number of mismatches between inputted characters and model characters in the recognition of inputted characters.

BRIEF DESCRIPTION OF THE DRAWING

Figure 4:
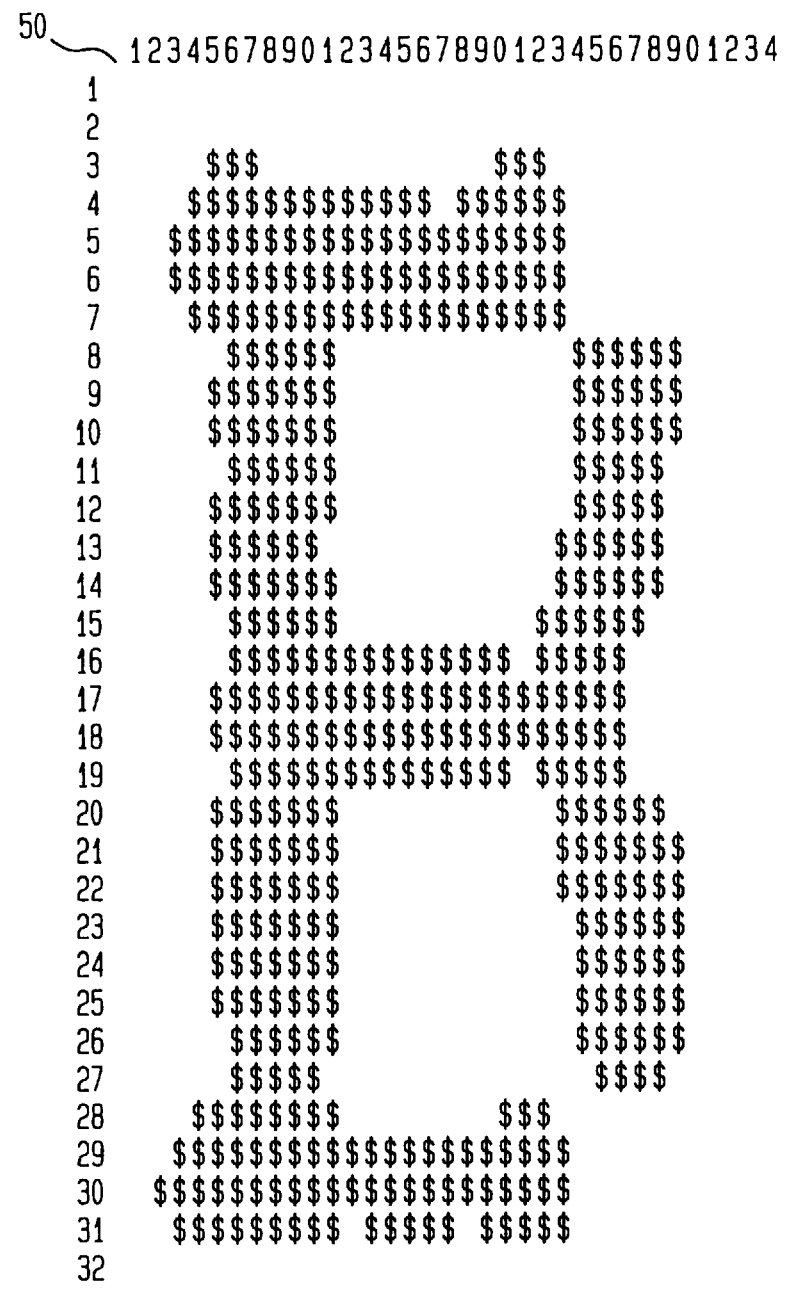

FIG. 4 illustrates a conventional pixellated image of an inputted character.

FIG. 12 illustrates an enlarged contour skeleton character image.

DETAILED DESCRIPTION OF THE INVENTION

Figure 6:
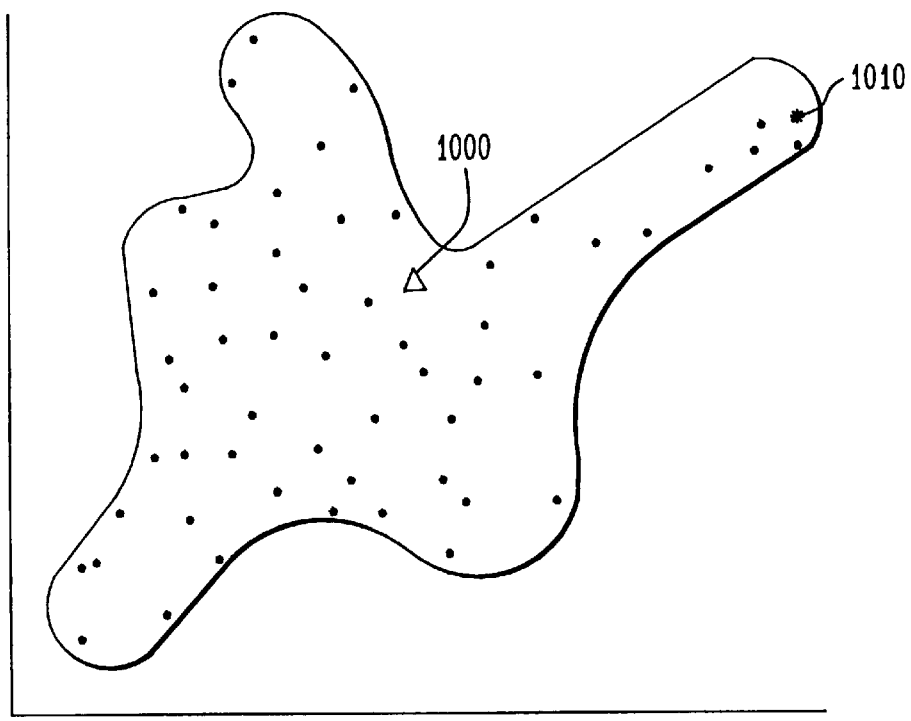
FIG. 6 shows a typical conventional distribution of specimen model character feature values.
Figure 5:
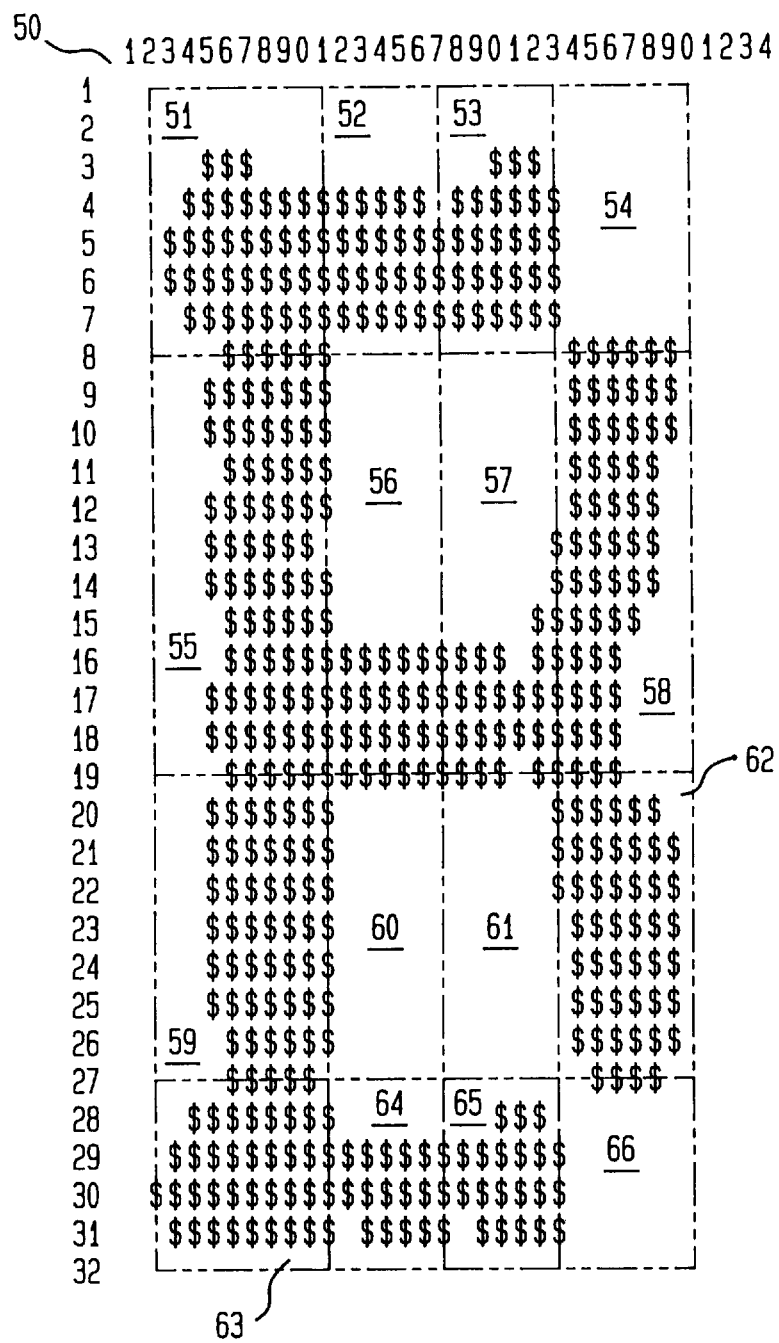
FIG. 5 illustrates the variable zonal segmentation of the pixellated image of FIG. 4.

Referring again to FIG. 6, the sample space of P specimens for a particular model character is shown. As shown, the specimens are rather non-uniformly distributed over the sample space. A raw mean feature value vector, determined as the mere average the features over all of the specimens, is therefore an unsatisfactory representation of the specimens.

Figure 7:
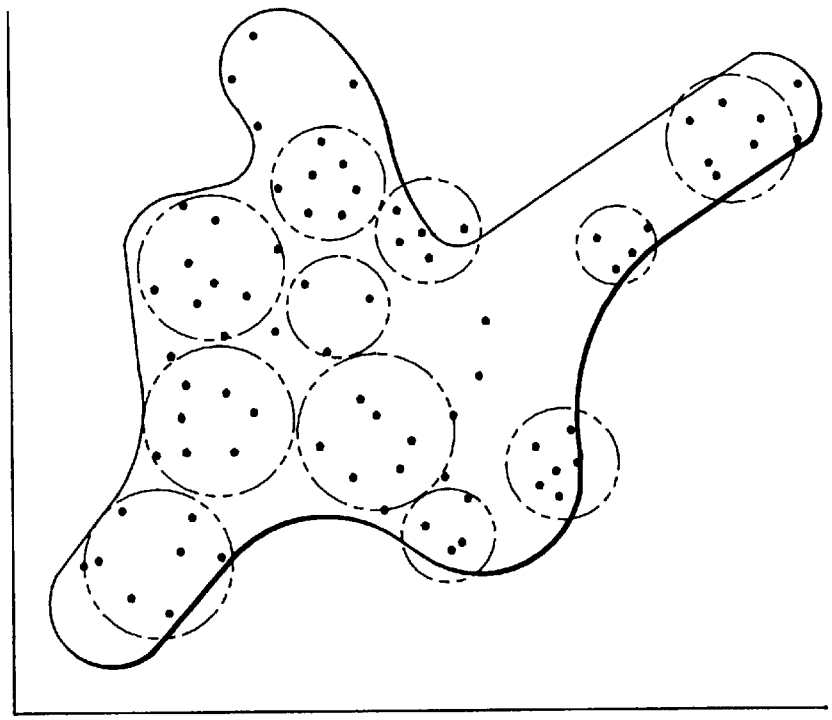
FIG. 7 illustrates the classification of the specimen model character feature values of FIG. 6 according to the present invention.

According to the invention, the sample space of the model character is classified into a number of classes such as is shown in FIG. 7. In FIG. 7, each circle represents a distinct class into which the specimens are classified. A mean feature value vector is determined for each class. The multiple classes better represent the non-uniform distribution of the specimens. The classification of the specimens and the determination of mean feature value vectors for each class is discussed in greater detail below.

Figure 8:
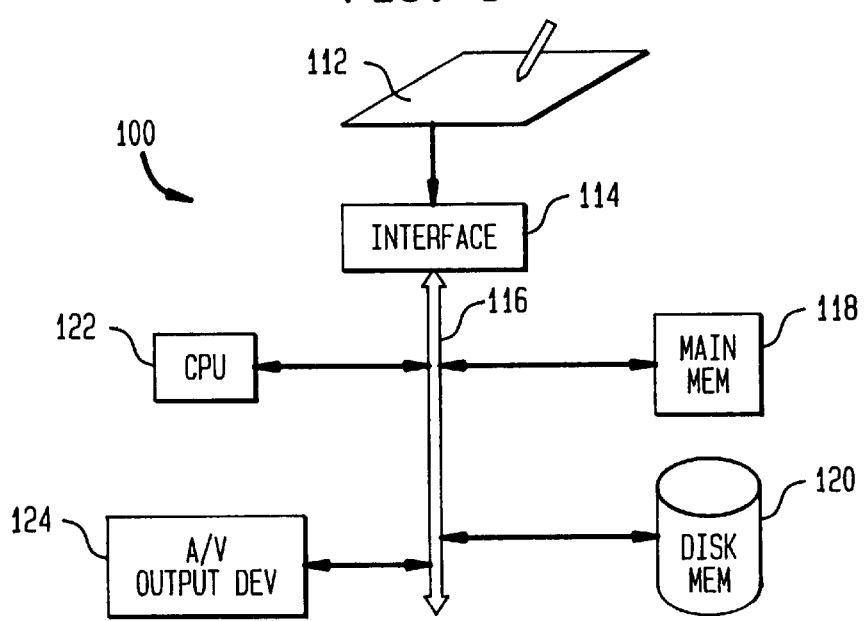
FIG. 8 illustrates a character recognition system according to an embodiment of the present invention.

Referring to FIG. 8, a character recognition system 100 according to one embodiment of the present invention is shown. Illustratively, the character recognition system 100 is adapted to recognize handwritten characters on-line, i.e., as they are written. The character recognition system 100 includes a stylus and tablet 112 for receiving inputted characters in handwritten form. The stylus and writing tablet convert each inputted handwritten character to a digital image in the form of a rectangular array of pixels that graphically represents the inputted handwritten character. This digital image serves as the inputted character data. The inputted character data is transmitted to an interface 114. The interface 114 transmits the inputted character data on a system bus 116. Also attached to the system bus 116 are a main memory 118, a disk memory 120, a CPU or processor 122 and an audio/video output device 124. Illustratively, the inputted character is received in the main memory 118 for temporary storage during processing. The CPU 122 executes a character recognition procedure on the inputted character data in the main memory 118. In the course of executing the character recognition procedure, the CPU 122 accesses a character recognition database, containing model characters, stored in the main memory 118 or disk memory 120.

Figure 1:
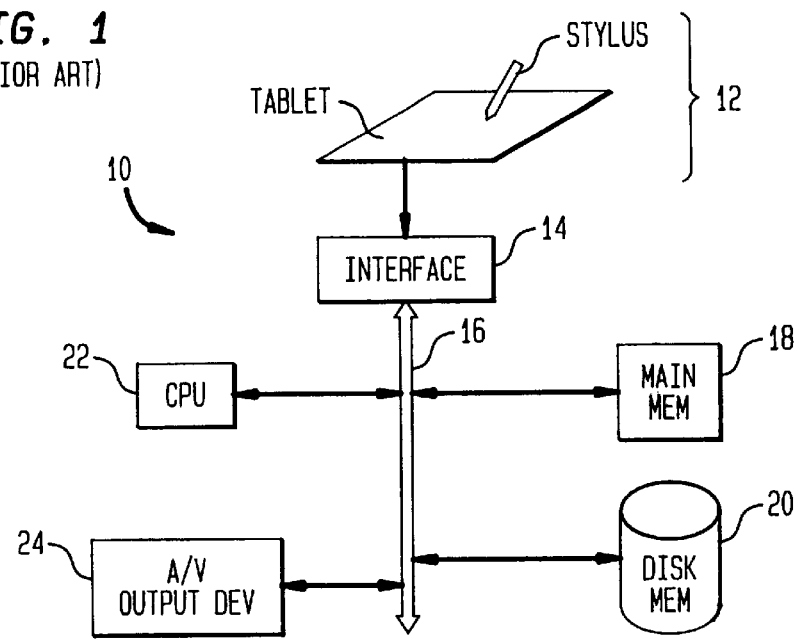
FIG. 1 shows a conventional character recognition system with a stylus and tablet character input device.
Figure 3:
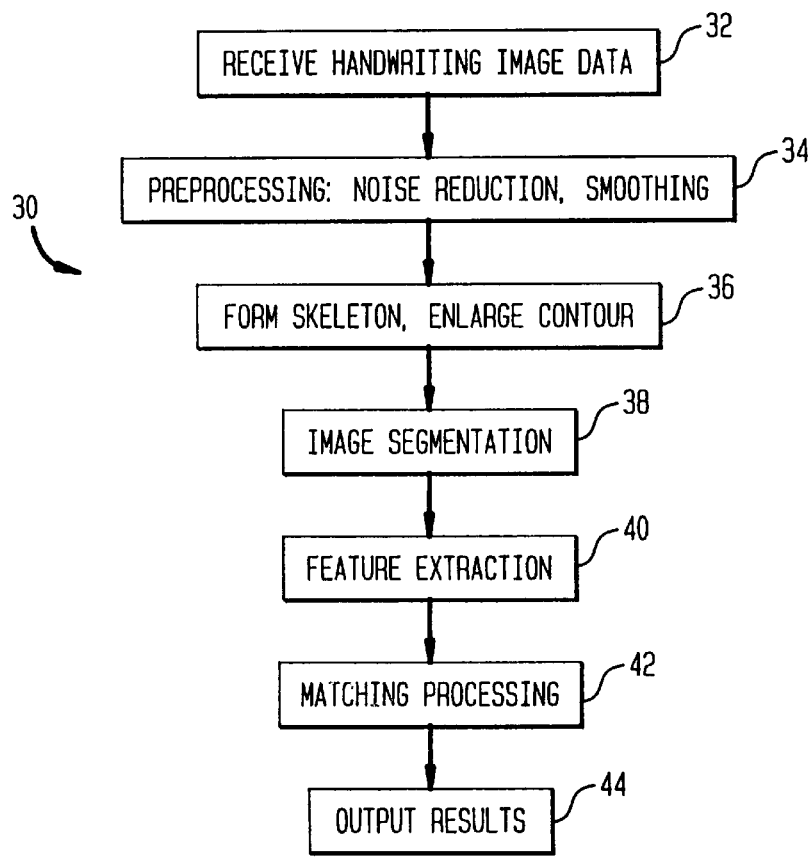
FIG. 3 is a flowchart which schematically illustrates a handwriting character recognition process which may be executed by the system of FIG. 1.
Figure 2:
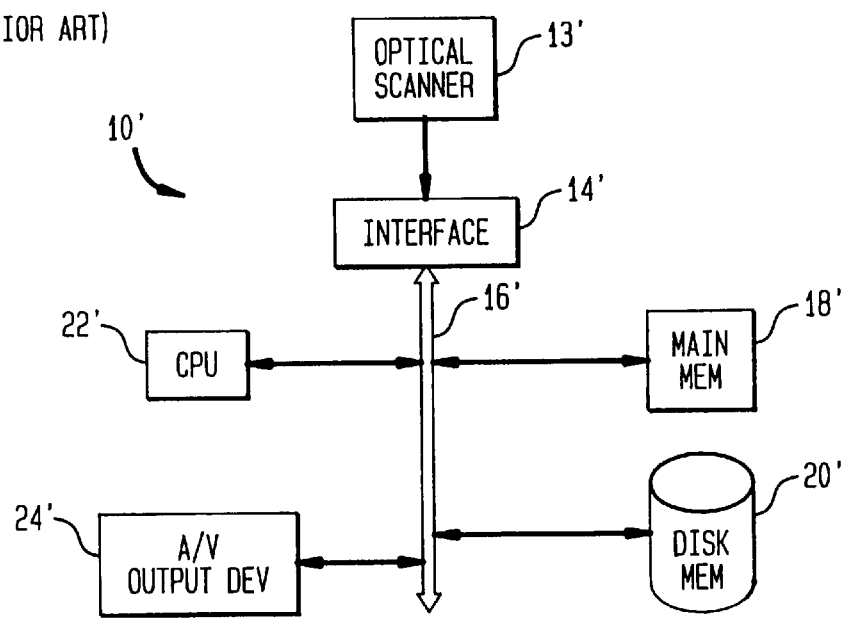
FIG. 2 shows a conventional character recognition system with an optical scanner character input device.
Figure 9:
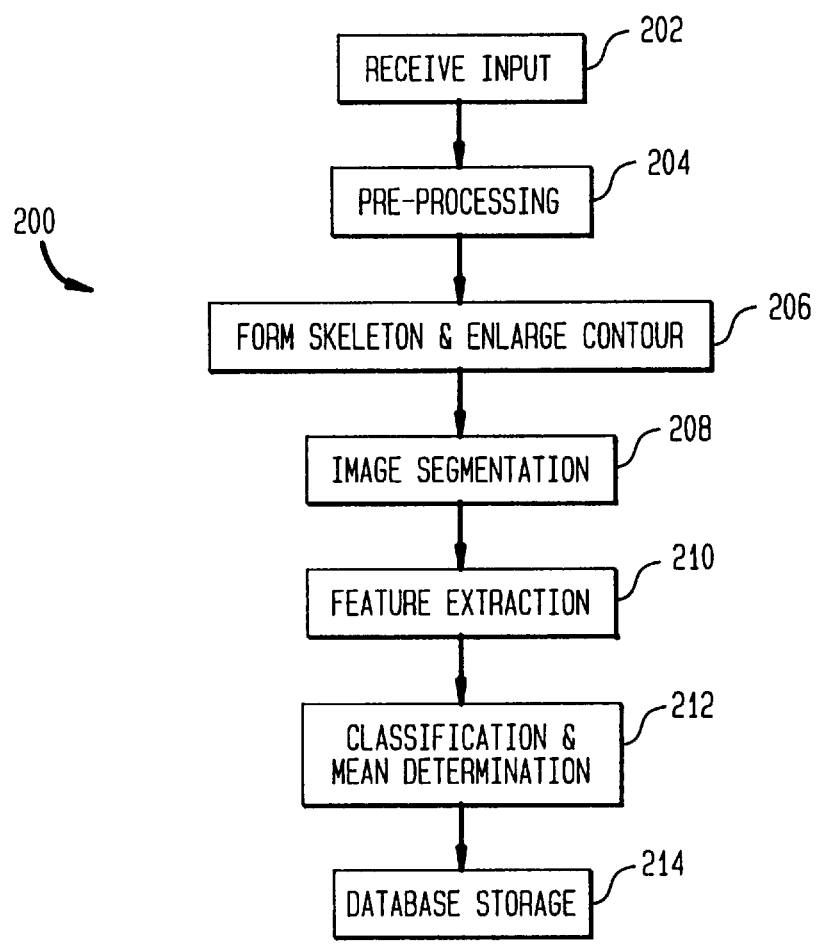
FIG. 9 is a flowchart which schematically illustrates a database generation process according to an embodiment of the present invention.

The character recognition process executed by the system 100 requires that the character recognition database be first constructed. Referring now to FIG. 9, a process for constructing such a database is schematically illustrated. In step 202, inputted model character specimens are received. Illustratively, in this step; character data representing a model character is produced by the stylus and tablet 112 (FIG. 8) in response to the user writing a character therewith. The inputted character data is transferred via the interface 114 (FIG. 1) and system bus 116 (FIG. 1) to the main memory 118 (FIG. 1). In step 204, the CPU 122 (FIG. 1) pre-processes the inputted character data. Illustratively the CPU 122 (FIG. 1) removes noise from the inputted character data. Furthermore, the CPU 122 smooths the lines of the character image. A noise reduced, smoothed character image, e.g., for a handwritten character eight, is shown in FIG. 10.

Figure 10:
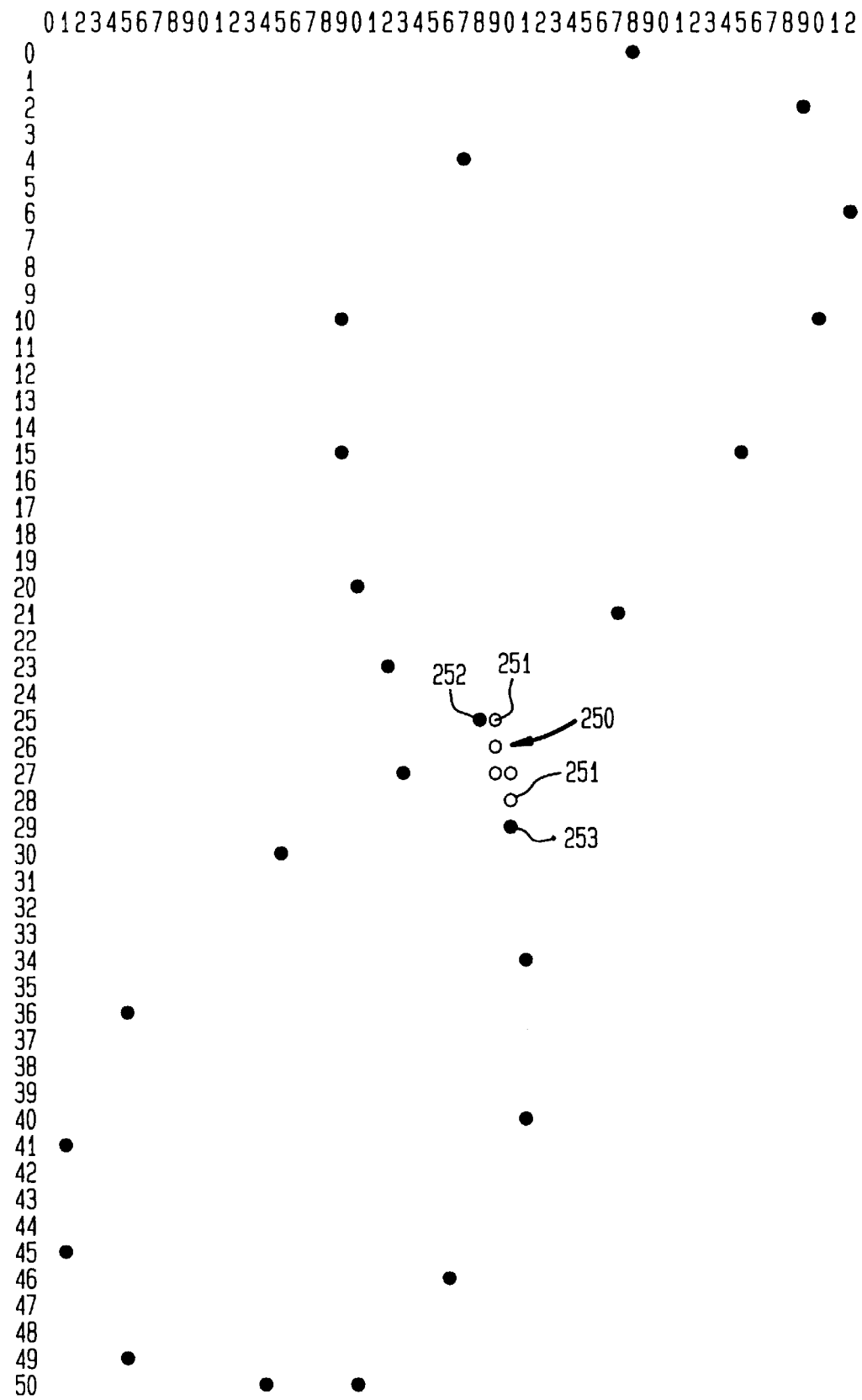
FIG. 10 illustrates a smoothed, noise-reduced character image.
Figure 11:
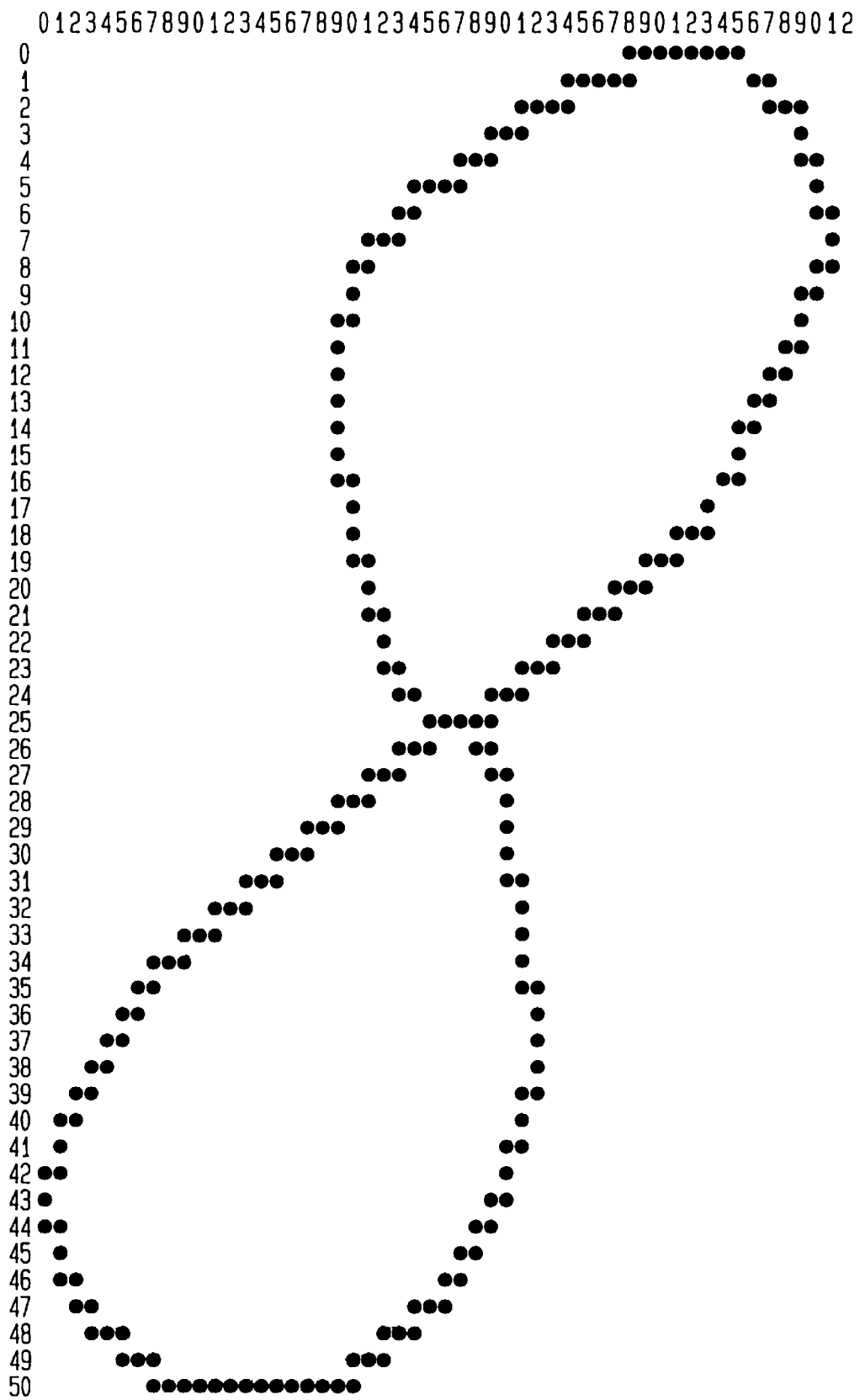
FIG. 11 illustrates a skeleton character image.

As shown in FIG. 10, the image of lines of the character may be discontinuous. That is, a portion 250 of the image, which should contain only adjacent filled pixels forming a continuous line, may contain blank pixels (e.g., the pixels 251) which separate filled pixels (e.g., the filled pixels 252 and 253). Such discontinuities may result from the preprocessing step 204. To remedy this problem, in step 206, the CPU 122 (FIG. 1) transforms the image of FIG. 10 into a skeleton image such as is shown in FIG. 11. Illustratively, the CPU 122 (FIG. 1) achieves this by interpolating between nearby filled pixels.

Figure 12:
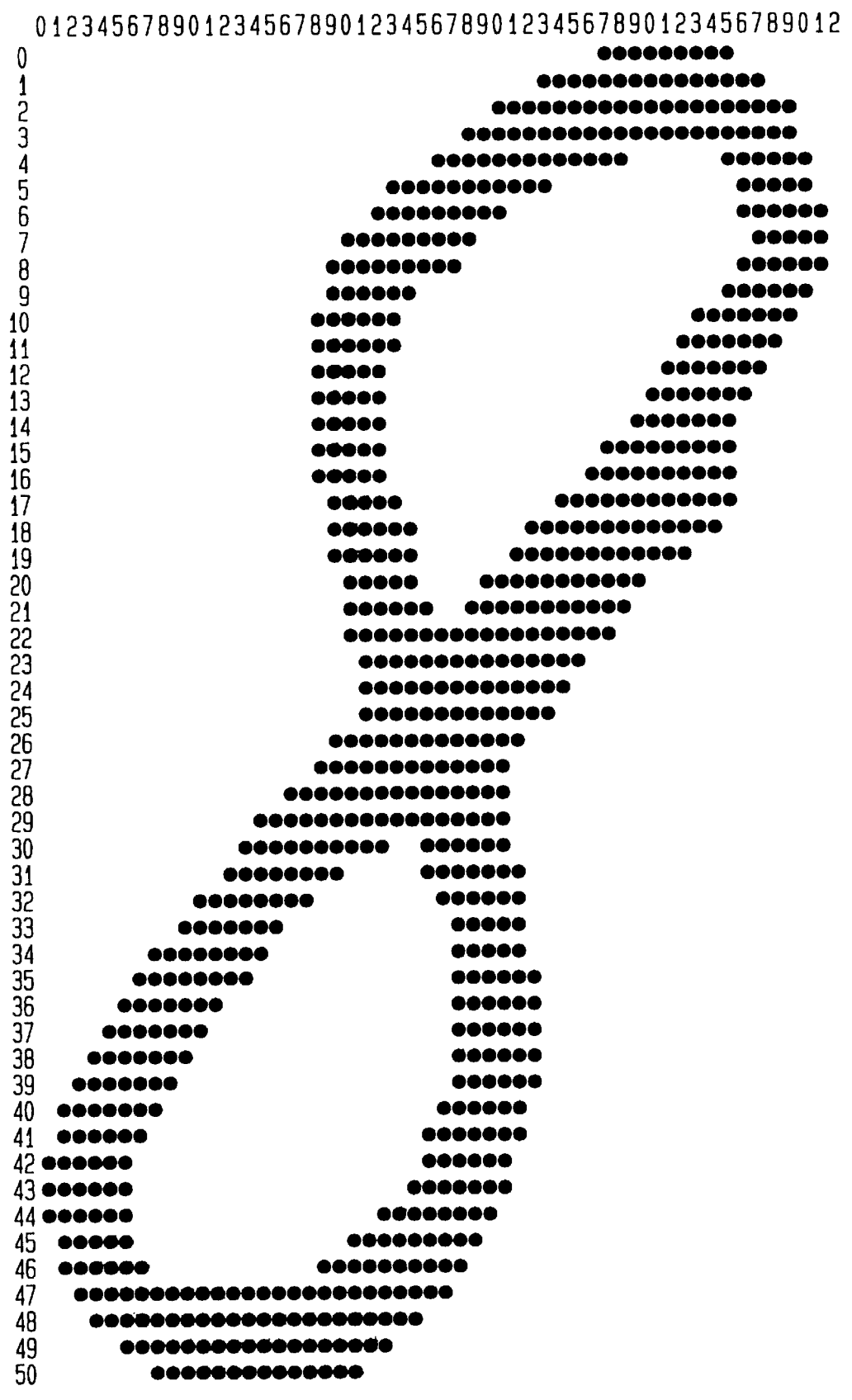

In addition, the CPU 122 (FIG. 1) transforms the skeleton image into an enlarged contour image such as is shown in FIG. 12. Illustratively, the enlarged contour image is simply a 3X widening of the pixels of the skeleton image of FIG. 11.

Figure 13:
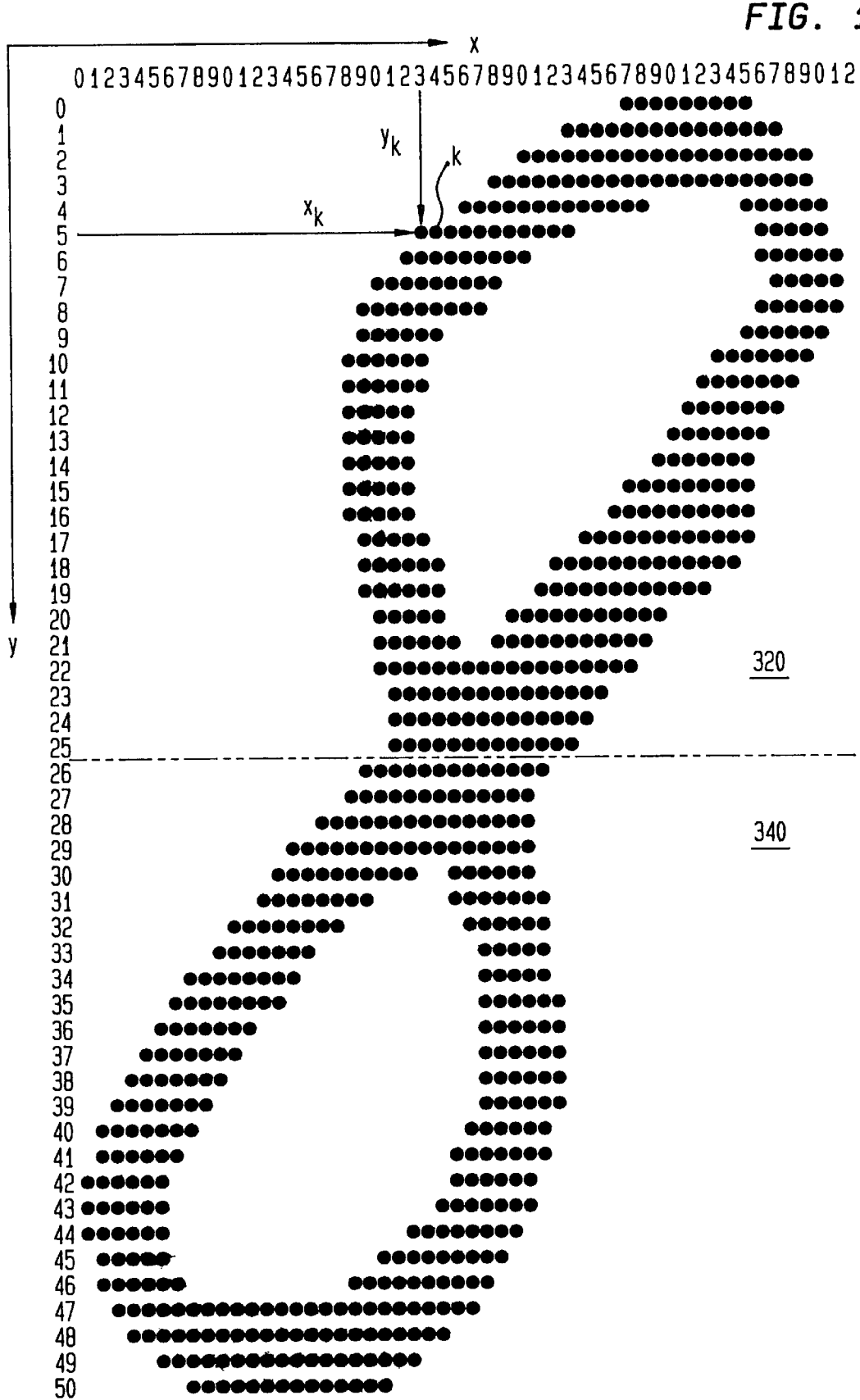
FIGS. 13–16 illustrate the segmentation of a character image into zones.
Figure 14:
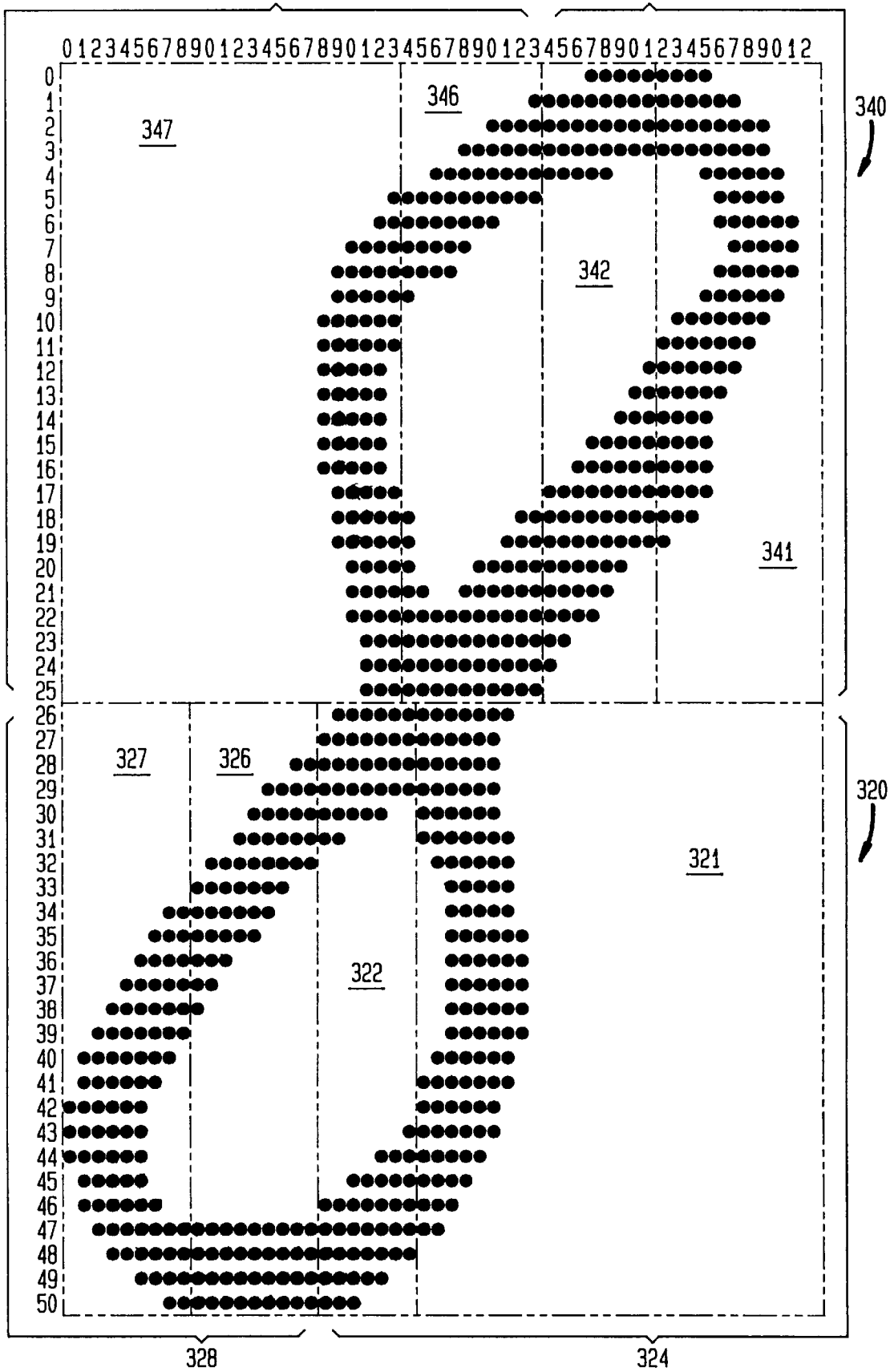
Figure 15:
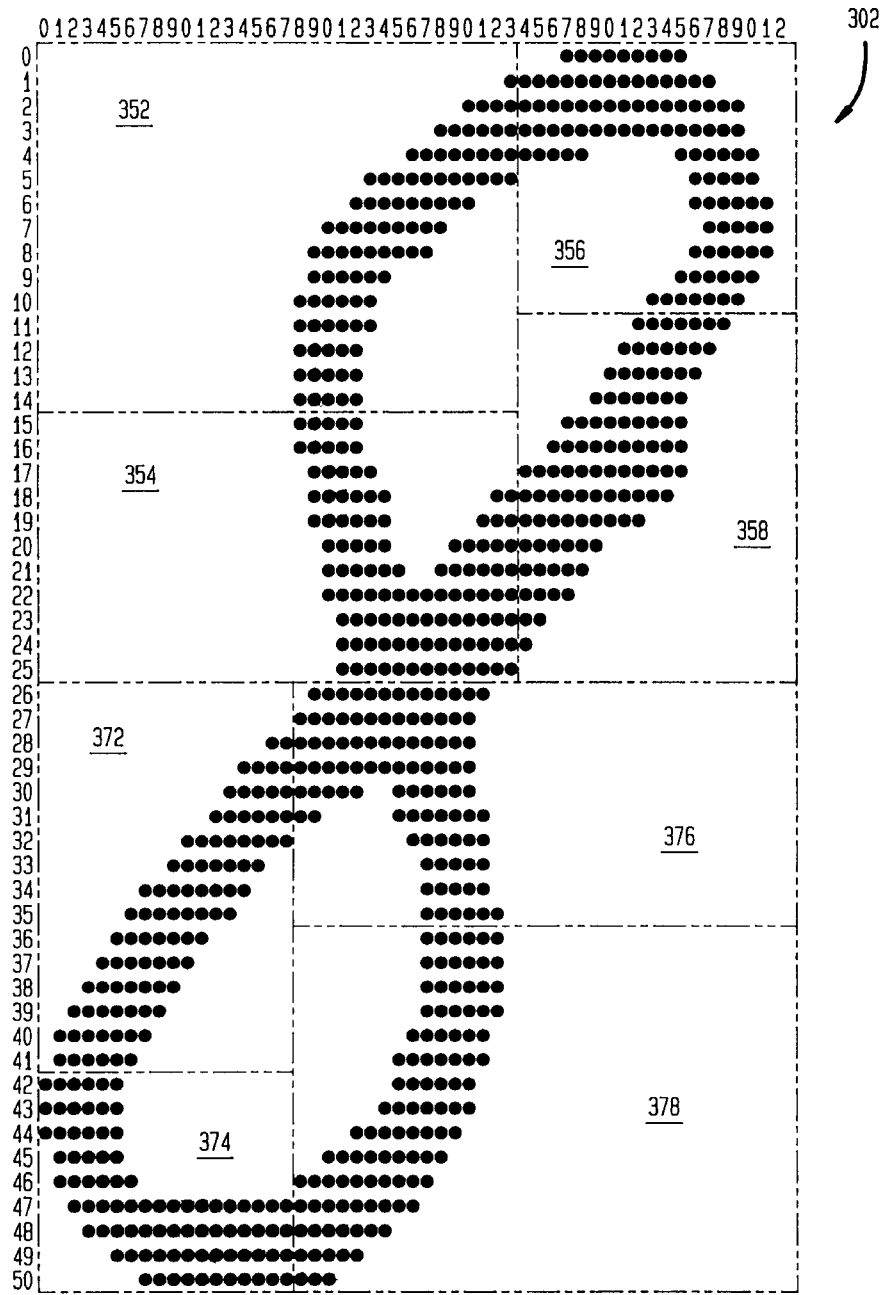
Figure 16:
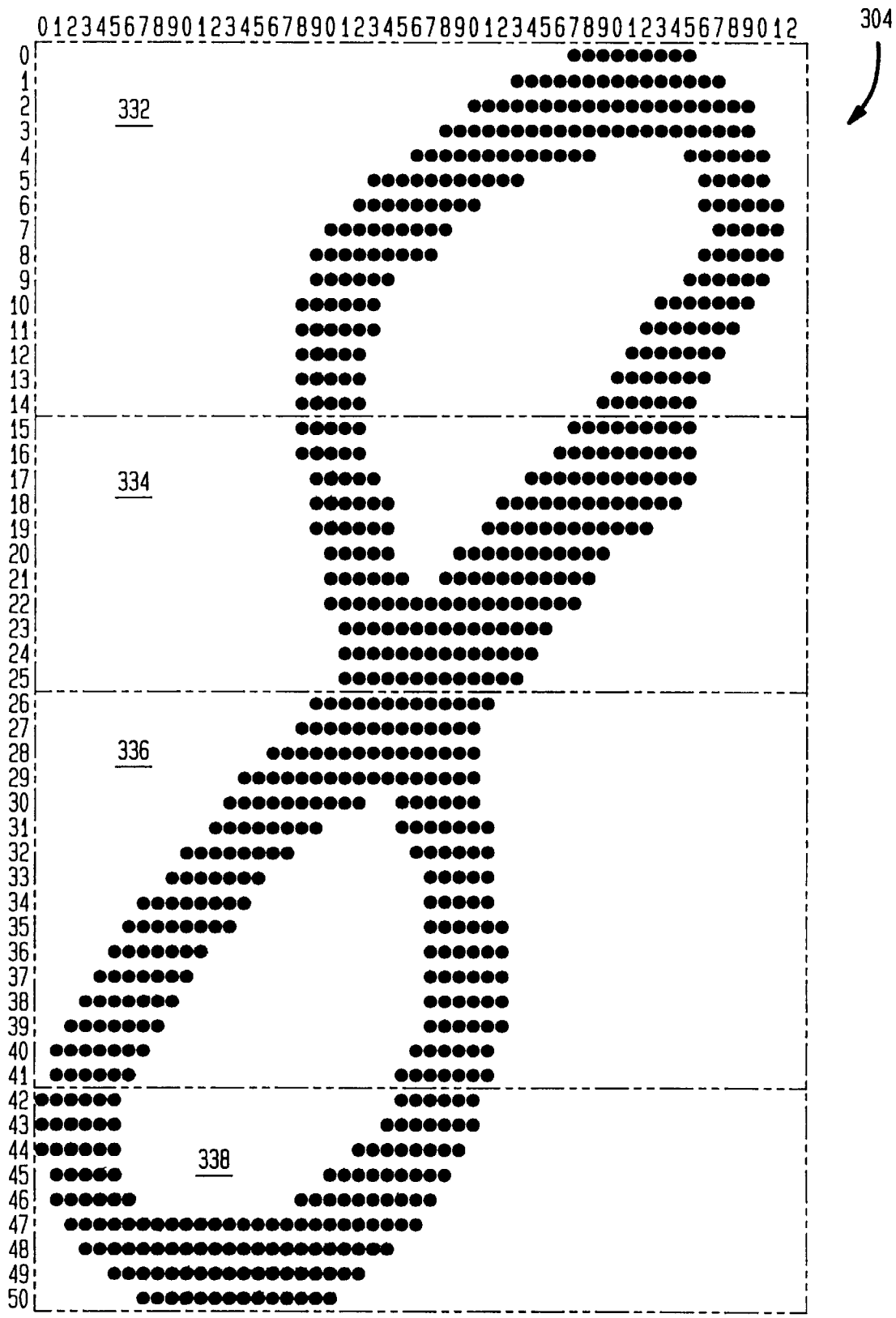

Next in step 208, the enlarged contour image is segmented. Illustratively, the CPU 122 (FIG. 1) segments the image into variable sized zones. Advantageously, the sizes of these zones depend on the distribution of pixels in the image of FIG. 12. One such variable segmentation process is illustrated in FIG. 13. Suppose each $k^{th}$ pixel has a horizontal coordinate $x_k$ and a vertical coordinate $y_k$ wherein x and y are measured relative to an origin in the upper left hand corner of the image as shown in FIG. 13. Each $k^{th}$ pixel has a value $f(x_k,y_k)$ wherein $f(x_k,y_k)=0$ for blank pixels and 1 for filled pixels. Define a horizontal center of gravity function $G_x$ and a vertical center of gravity function $G_y$ such that:

$$G_x = \frac{\sum_{k=1}^{K} x_k \cdot f(x_k, y_k)}{\sum_{k=1}^{K} f(x_k, y_k)} \quad G_y = \frac{\sum_{k=1}^{K} y_k \cdot f(x_k, y_k)}{\sum_{k=1}^{K} f(x_k, y_k)} \quad (4)$$

where K is the total number of pixels in the image of the character. The CPU 122 (FIG. 1) segments the character image as follows. The CPU 122 determines whether to divide the image vertically or horizontally. Illustratively, the determination may be in accordance with a preselected scheme. To divide the image horizontally, the CPU 122 evaluates the vertical center of gravity function Gy to locate the position at which a horizontal dividing line should cross the vertical axis. Likewise, to divide the image vertically, the CPU evaluates the horizontal center of gravity function Gx to locate the position at which a vertical dividing line should cross the horizontal axis. The CPU 122 (FIG. 1) then segments the image into two zones at the dividing line located in, the above fashion. For instance, as shown in FIG. 13, the character image is divided horizontally into two zones 320 and 340. The CPU may repeat the segmentation process on each of the segmented zones 320 and 340. Again, this may be done according to a predetermined scheme of whether, and in which zones, to divide horizontally and vertically. For instance, as shown in FIG. 14, the zone 320 is vertically divided into the zones 324 and 328 and the zone 340 is vertically divided into the zones 344 and 348, etc. Advantageously, in step 208, the CPU produces three segmented images 300, 302 and 304 as shown in FIGS. 14, 15 and 16.

Next in step 210, the CPU 122 (FIG. 1) extracts feature values from the segmented character images 300 and 302. Values may be extracted for a variety of features. Advantageously, the values that are extracted for the particular features discussed below are utilized for forming the character recognition database (and extracted for inputted characters in the recognition process discussed below).

Figure 17:
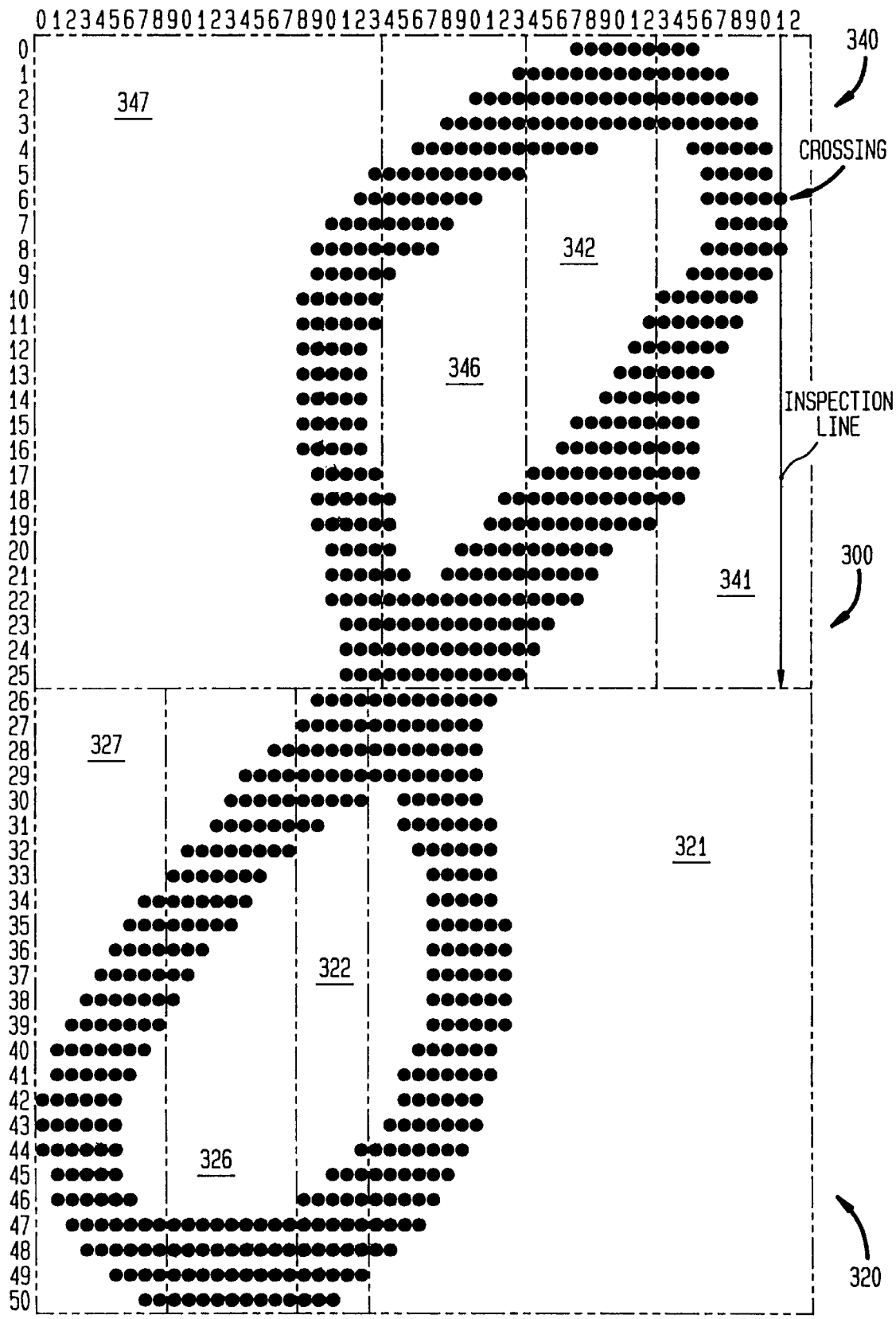
FIG. 17 illustrates the extraction of stroke density function feature values.

Referring to FIG. 17, the extraction of stroke density function (SDF) feature values is illustrated. In evaluating the SDF, the CPU 122 (FIG. 1) projects a number of inspection lines in each zone in which the SDF is evaluated. The CPU 122 (FIG. 1) then counts the number of times the graphical image of the character crosses-an inspection line within the zone. The total number of crossings is divided by the total number of inspection lines to produce the result of the SDF function (which, in turn, is the SDF feature value). Illustratively, the CPU 122 (FIG. 1) does not evaluate the SDF in every zone. Rather, the CPU 122 (FIG. 1) illustratively evaluates the SDF in the eight vertical zones 321, 322, 326, 327, 341, 342, 346 and 347 and in four horizontal zones 332, 334, 336,, and 338 to produce 12 feature values.

Figure 18:
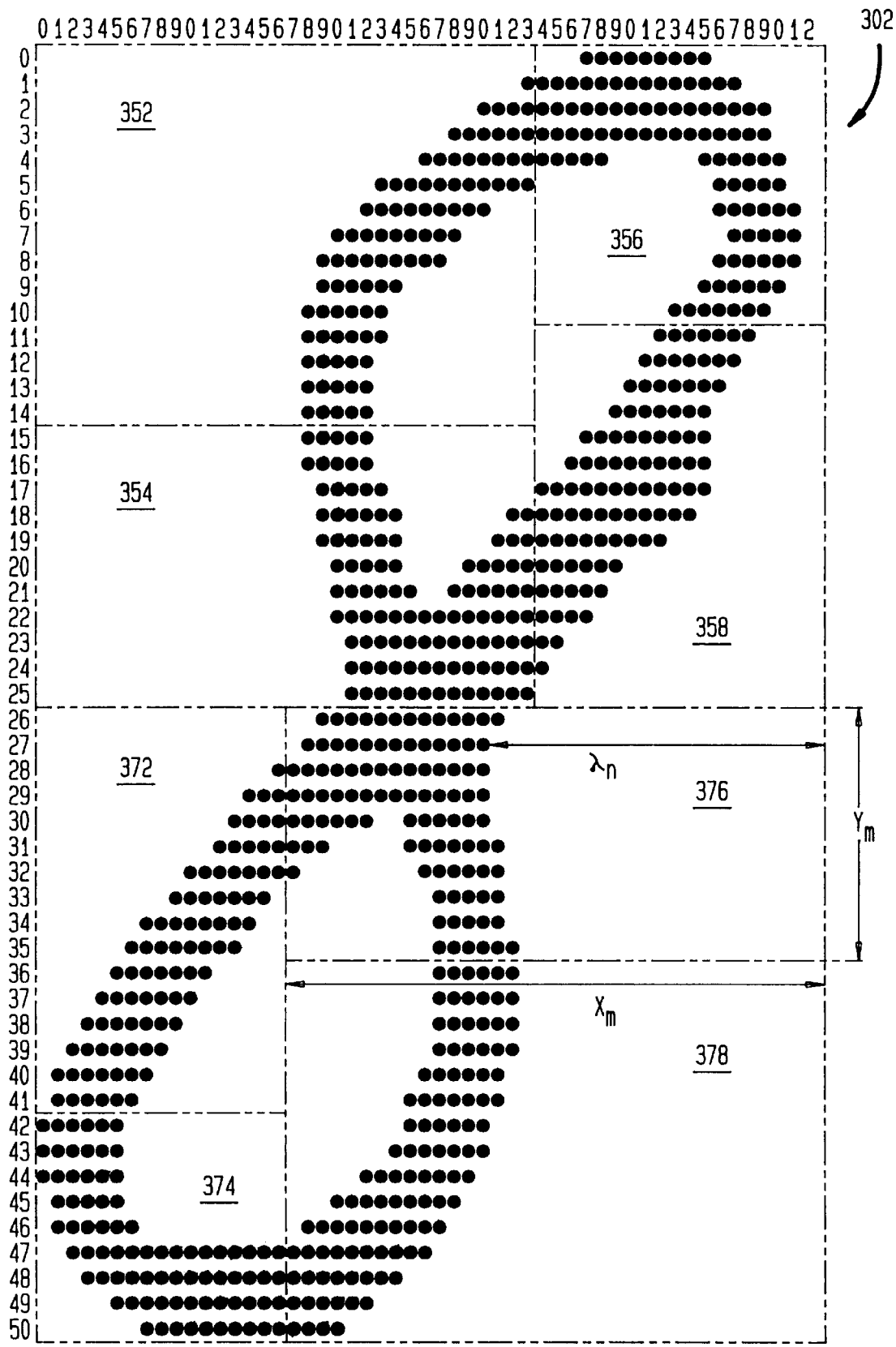
FIG. 18 illustrates the extraction of contour line length feature values.

Referring to FIG. 18, the extraction of peripheral background area (PBA) feature values is described. In determining the PBA, the CPU 122 (FIG. 1) evaluates the following function:

$$PBA = \sum_{n=1}^{N} \frac{\lambda_n}{X_m \cdot Y_m} \quad (5)$$

where n is an index of points on either the horizontal (x) or vertical (y) axis which successively takes on each value from 1 to the maximum dimension N of the character image rectangle on that axis. $\lambda_n$ is the distance in pixels from the $n^{th}$ location to a filled pixel of the character image. As shown in FIG. 18, the CPU 122 (FIG. 1) measures $\lambda_n$ perpendicularly from the corresponding axis. The variable m takes on a value which indicates the particular zone for which the PBA function is evaluated. $X_m$ represents the horizontal width of the $m^{th}$ zone and $Y_m$ represents the vertical height of the $m^{th}$ zone.

The CPU 122 (FIG. 1) evaluates the PBA in the vertical direction for each of the zones 321, 322, 326, 327, 341, 342, 346 and 347. The PBA is evaluated in the horizontal direction for the zones 352, 354, 356, 358, 372, 374, 376 and 378. Thus, 16 feature values are extracted.

Figure 19:
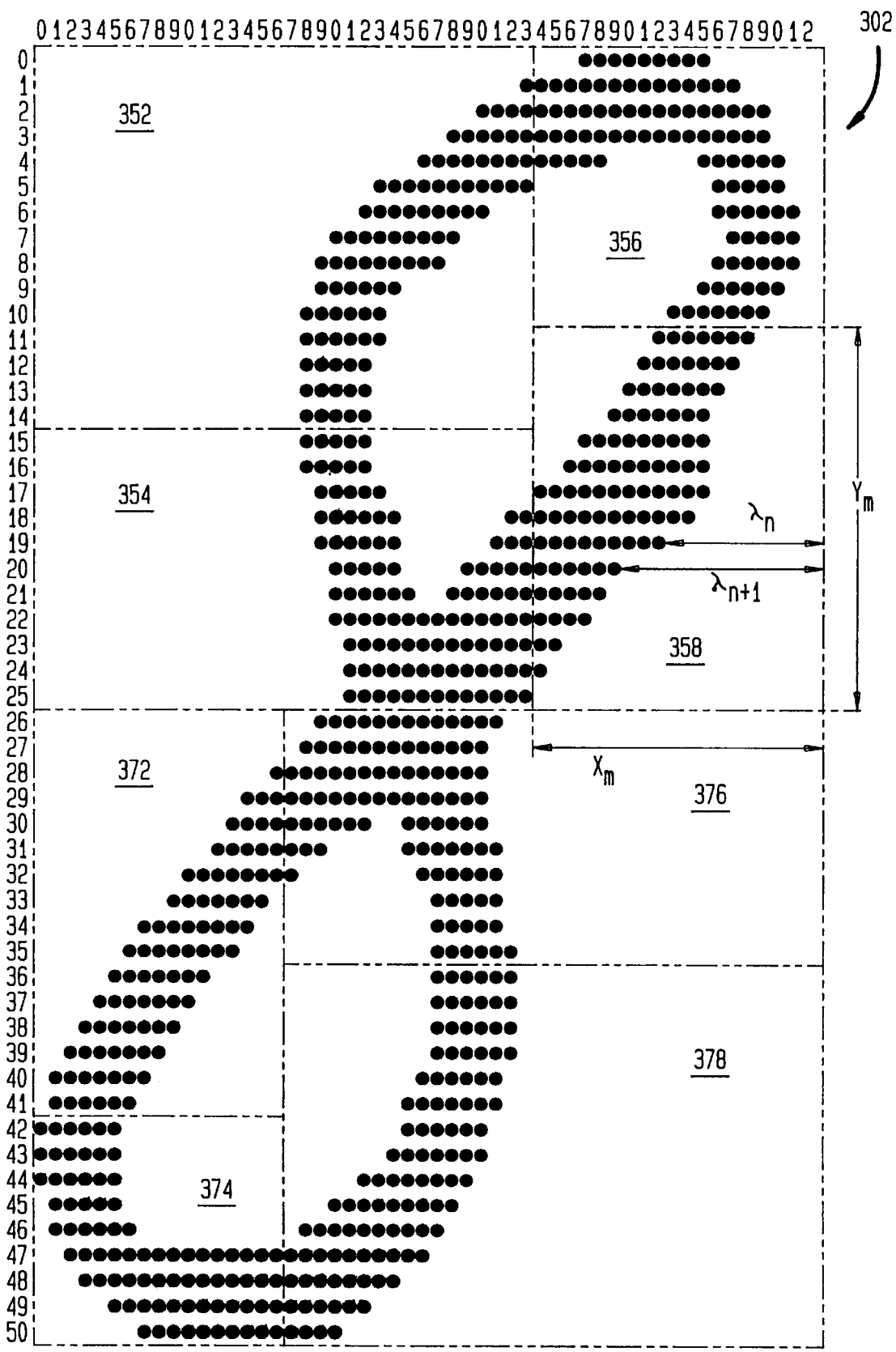
FIG. 19 illustrates the extraction of peripheral background area feature values.

Referring to FIG. 19, the extraction of the contour line length (CLL) feature values is described. In determining the CLL feature values, the CPU evaluates the following formula:

$$\Delta\lambda_n = \lambda_{n+1} - \lambda_n \quad (6)$$

$$CLL_1 = \sum_{n=1}^{N} \frac{\Delta\lambda_n}{X_m + Y_m}, \text{ for each } \Delta\lambda_n < 0$$

$$CLL_2 = \sum_{n=1}^{N} \frac{\Delta\lambda_n}{X_m + Y_m}, \text{ for each } \Delta\lambda_n > 0$$

The variables m, n, $X_m$, $Y_m$ and $\lambda_n$ are as described above. The CPU 122 (FIG. 1) obtains two CLL feature values, namely $CLL_1$ and $CLL_2$, for both of the vertical and horizontal zones 324, 328, 344 and 348. This produces 16 feature values.

Figure 20A:
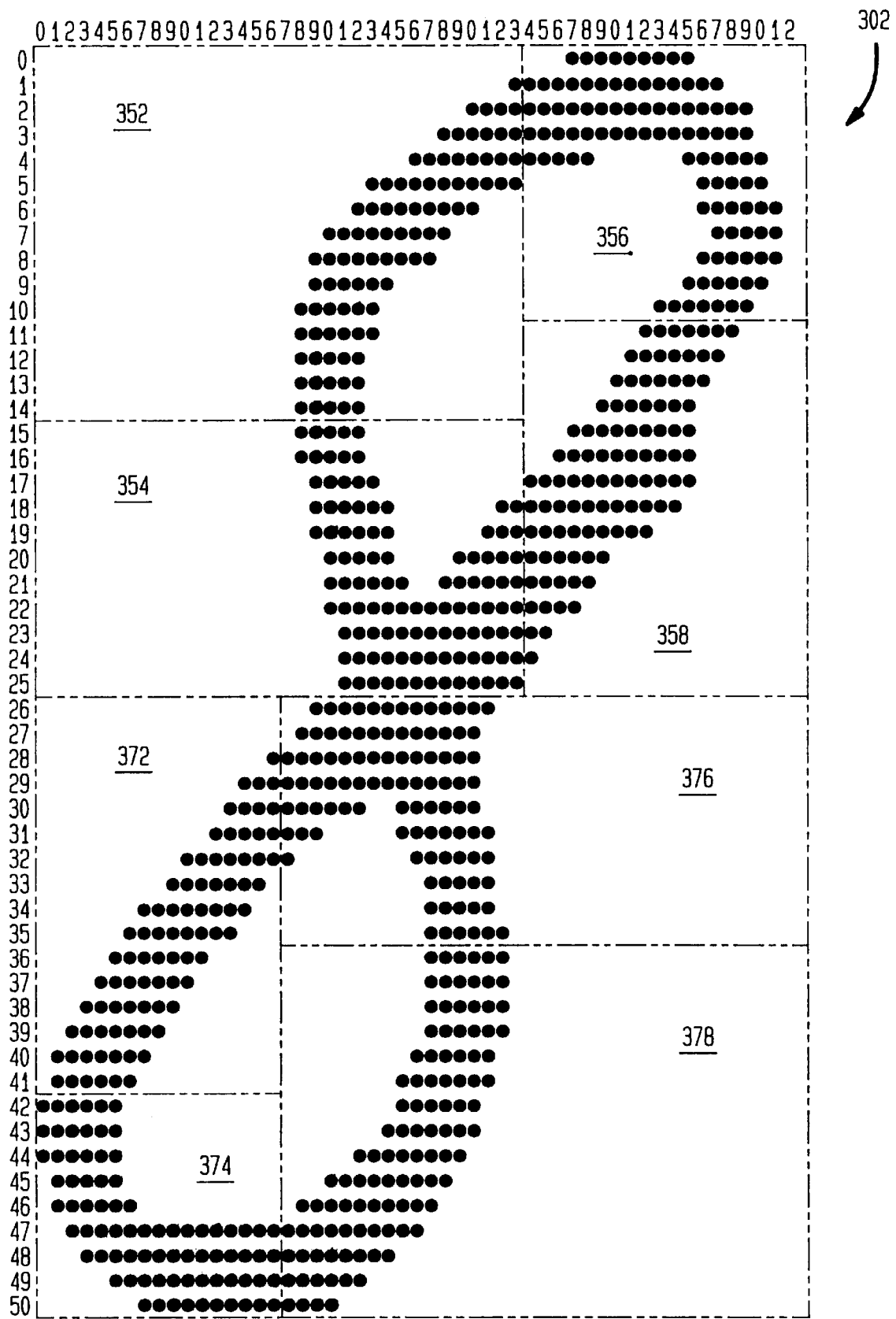
FIG. 20 illustrates the extraction of gradient feature values.
Figure 20:
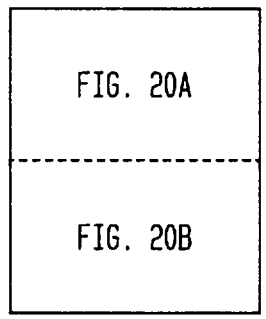
Figure 20B:
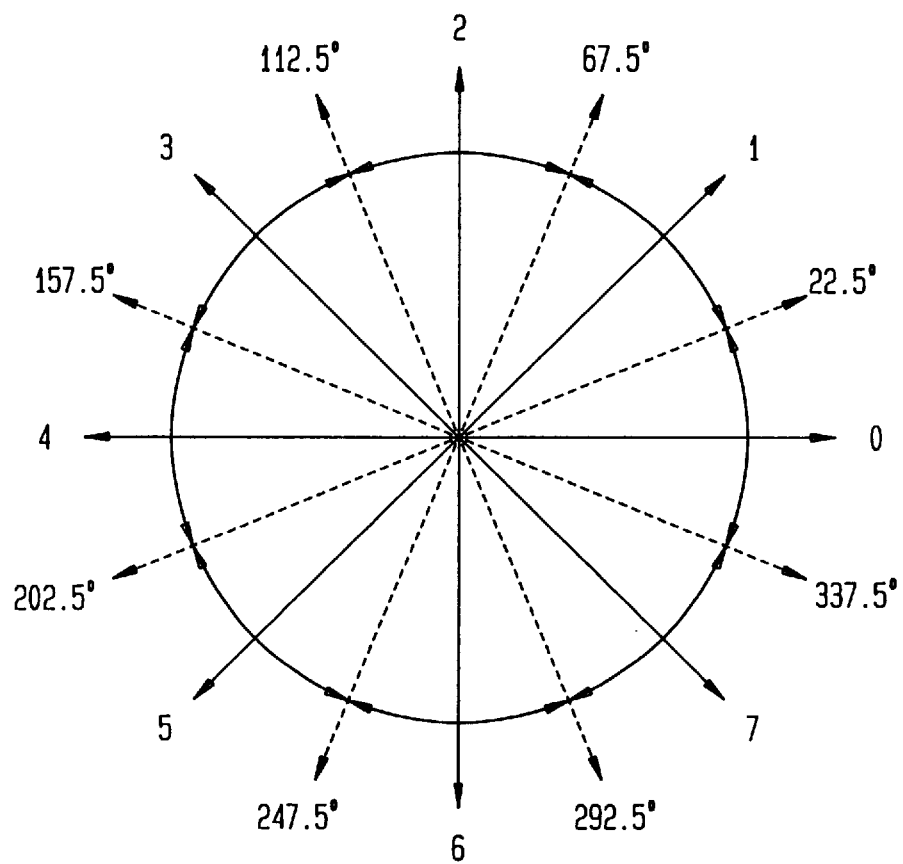

Referring to FIG. 20, gradient feature values are extracted. First, the CPU 122 (FIG. 1) assigns a direction code $Dir_{i,j}$ to each pixel of the character image in the $i^{th}$ column and $j^{th}$ row of the character image. The variables i and j are indexes in the horizontal (x) and vertical (y) directions, respectively. The direction code corresponds to a direction that is normal to a tangent line at the pixel. As shown in FIG. 20, there are eight possible direction codes which can be assigned, each corresponding to a 45° angle direction, i.e., 0 for 337.5° to 22.5°, 1 for 22.5° to 67.5°, 2 for 67.5° to 112.5°, 3 for 112.5° to 157.5°, 4 for 157.5° to 202.5°, 5 for 202.5° to 247.5°, 6 for 247.5° to 292.5° and 7 for 292.5° to 337.5°. Thereafter, the CPU 122 (FIG. 1) generates a vector of lengths Len($Dir_{i,j}$) in each zone using the following formulas:

$$Len = \sqrt{X^2 + Y^2} \quad (7a)$$

$$(Dir_{i,j} - 1) \cdot \frac{\pi}{8} \leq \tan^{-1}\left(\frac{Y}{X}\right) < (Dir_{i,j} + 1) \cdot \frac{\pi}{8} \quad (7b)$$

$$\sum_{i=1}^{I} \sum_{j=1}^{J} \frac{Len_{i,j}(Dir_{i,j})}{Bdd_m(Dir_{i,j})}, \text{ for each } Dir_{i,j} \quad (7c)$$

where $Bdd_m$ ($Dir_{i,j}$) represents the boundary width of the m-th zone which direction is normal to ($Dir_{i,j}$), and wherein X and Y are values generated using the following kernels:

| -1 | 0 | 1 |
|----|---|---|
| -1 | * | 1 |
| -1 | 0 | 1 |

X

| 1  | 1  | 1  |
|----|----|----|
| 0  | *  | 0  |
| -1 | -1 | -1 |

Y (7d)

The CPU 122 applies the kernels to each pixel of the character image prior to determining the length Len in the appropriate direction $Dir_{i,j}$. The lengths $Len_{i,j}$ are then combined as per equation (7c) to produce a single value for each of the eight directions $Dir_{i,j}$. Thus, the CPU 122 )FIG. 1) generates eight gradient feature values for each zone. Illustratively, the gradient feature values are extracted from each of the eight zones 352, 354, 356, 358, 372, 374, 376 and 378 thereby generating sixty-four feature values.

In total, the CPU 122 (FIG. 1) illustratively extracts one hundred and eight feature values for each specimen model character inputted to the system 100.

Referring back to FIG. 9, after extracting the features of the inputted specimen model characters, the CPU 122 (FIG. 1) classifies the specimen model characters for each model character in step 212. The classification step is performed for each model character separately. For example, consider the case where P specimens are inputted for each model letter of the English alphabet and for each model numeral. The CPU classifies the specimens for the model character "A", then the specimens for the model character "B", etc.

Figure 21:
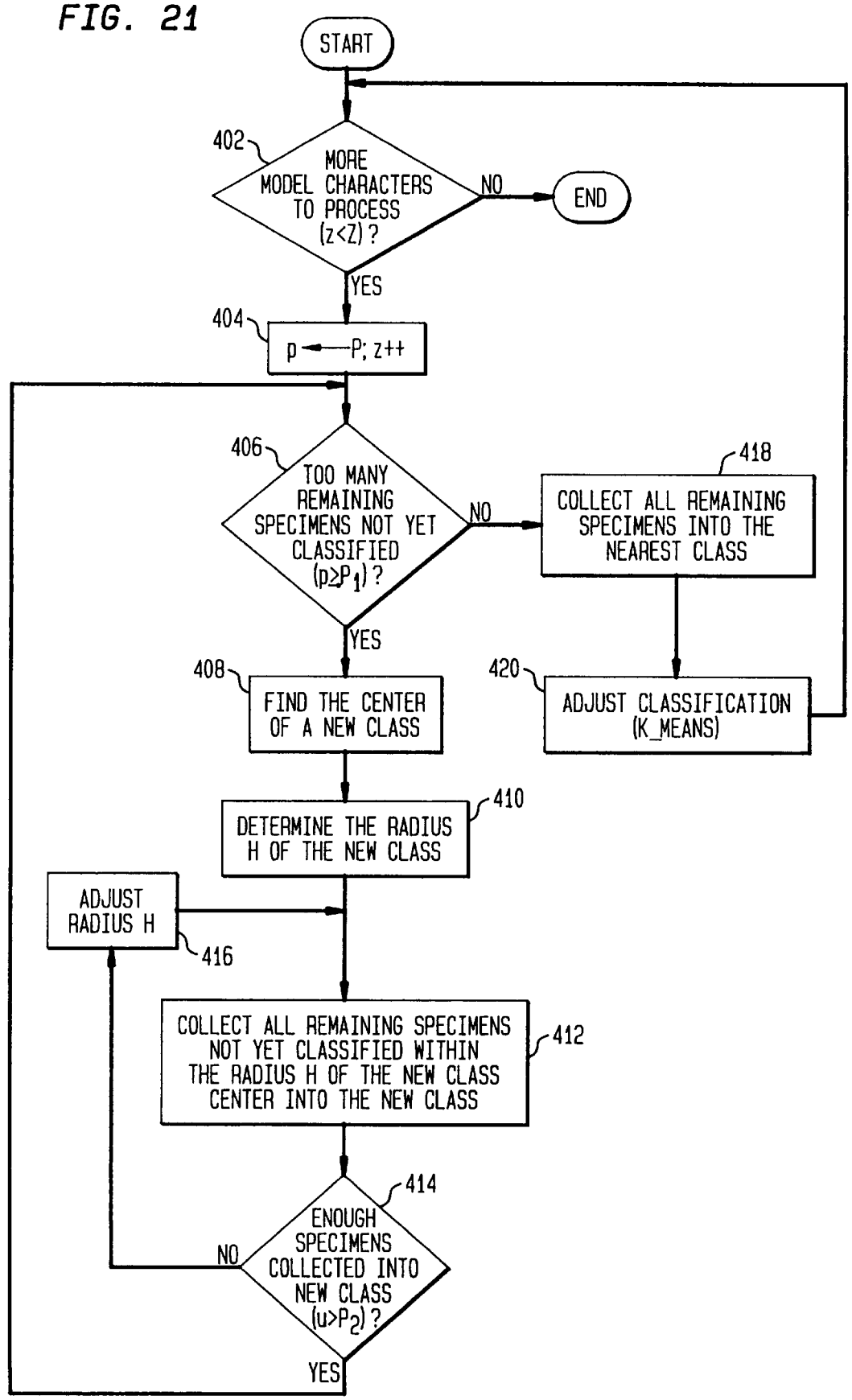
FIG. 21 is a flowchart which schematically illustrates a classification process according to an embodiment of the present invention.

FIG. 21 schematically illustrates a classification process executed by the CPU 122 (FIG. 1). Illustratively, the CPU 122 (FIG. 1) executes the classification process of FIG. 21 for the specimens on a model character-by-model character basis.

In step 402, the CPU determines if there are more model characters z to process (i.e., if the index of the model character z is less than the total number of model characters Z). If z≧Z, then execution of the classification step ceases. If z<Z, execution proceeds to step 404 wherein the CPU 122 (FIG. 1) increments the class index r by one and sets the variable p equal to the number of unclassified specimens, i.e., the total number of specimens P inputted for the model character z.

Next in step 406, the CPU 122 (FIG. 1) determines if too many specimens remain which have not yet been classified. Advantageously, the CPU 122 (FIG. 1) simply compares the number of remaining specimens not yet classified p to a first threshold $P_1$. If $p<P_1$, then a sufficient number of the specimens inputted for the model character z have been classified, and execution branches to step 418. Step 418 is discussed in greater detail below. If $p \geq P_1$ then too many specimens remain which have not yet been classified and execution branches to step 408. In step 408, the CPU 122 (FIG. 1) locates the center of a new class to be formed. Illustratively, this may be achieved by setting the new class center equal to the mean feature value vector of all of the remaining specimens which have not yet been organized into any class p. In step 410, the CPU 122 (FIG. 1) determines a radius H about the center of the new class. Illustratively, the radius H is determined using a function of the standard deviation of the new class such as:

$$H = \sum_{l=1}^{L} V_l \quad (2)$$

where:

l is an index identifying a particular feature and is defined over the range of 1 . . . L, L is the total number of features, and
$V_l$ is the standard deviation of the $l^{th}$ feature.

Next in step 412, the CPU 122 (FIG. 1) collects into the new class all of the remaining specimens which have not yet been organized into any class, and which are within a distance equal to the radius H from the center of the new class. The number of specimens u collected into the new class is also determined. Then in step 414, the CPU 122 (FIG. 1) determines if the new class contains a threshold minimum number of values $P_2$. If $u \geq P_2$, then the new class has a sufficient minimum number of values, and execution proceeds to step 406. If $u < P_2$, then the class is too small. In such a case, the CPU 122 (FIG. 1) executes step 416. In step 416, the CPU 122 adjusts, i.e., enlarges, the radius H. Thereafter, execution returns to step 412 in which the CPU 122 (FIG. 1) recollects remaining, unclassified specimens into the new class. Thus, steps 412–416 are re-executed until the number of specimens u collected into the new class is greater than the second threshold $P_2$.

When execution returns to step 406, the CPU 122 once again determines if the number of remaining unclassified specimens is too great, i.e., if $p \geq P_1$. If so, steps 408–416 are repeated to generate, yet another class into which remaining unclassified specimens are collected. Thus, the CPU 122 (FIG. 1) repeats steps 406–416 a sufficient number of times until less than $P_1$ specimens for the character z remain which are not yet organized into any class. Thereafter, execution proceeds to step 418. In step 418, the CPU 122 (FIG. 1) collects each remaining specimen not yet in any class into the class nearest thereto. After all specimens have been organized into a class, the CPU 122 (FIG. 1) calculates the mean of each class, i.e., the mean feature value vector of the feature values of the specimens in each class. This produces multiple mean feature value vectors for the model character z including one mean feature value vector for each class.

Illustratively, the CPU 122 (FIG. 1) then executes step 420. In step 420, the CPU 122 (FIG. 1) executes the well known K_means procedure. See DEVIJVER & KITTLER, PATTERN RECOGNITION: A STATISTICAL APPROACH p. 409 (1982). In executing steps 406–416 the CPU 122 generates an arbitrary "clustering" of the P specimens for the model character z. However, some of the specimens may be located near class boundaries. The K_means procedure adjusts the classification by reclassifying, i.e., moving, specimens near class boundaries into other classes so that the classification is, stabilized for recognition. The K_means process is as follows. The CPU 122 (FIG. 1) selects each specimen, one at a time, and assigns the selected specimen to the nearest class (the class whose mean feature value vector is closest to the feature value vector of the selected specimen). If the nearest class is not the original class in which the specimen was classified, then a semaphore is signalled indicating that the classification has been changed. The CPU 122 (FIG. 1) then recalculates the mean feature value vectors of each class. The CPU 122 (FIG. 1) continuously repeats the above iteration over all specimens until an iteration occurs in which the semaphore is not signalled.

After executing step 420, execution returns to step 402. Thus, the CPU 122 (FIG. 1) repeats steps 402–420 for each model character z. After classifying the specimens of all Z model characters, the CPU 122 (FIG. 1) advantageously determines the mean standard deviation $S_l$ for each feature value over all of the classes C in the database (i.e., over all model characters Z) according to the following formula:

$$S_l = \frac{1}{C} \sum_{c=1}^{C} V_{lc} \qquad (3)$$

where $V_{lc}$ is the standard deviation of the $l^{th}$ feature in a given $c^{th}$ class.

Referring back to FIG. 9, after all of the specimen model characters have been classified and after all mean feature value vectors (and average standard deviations) have been determined, the CPU 122 constructs the character recognition database and stores it, e.g., in the disk memory 120. Illustratively, the CPU 122 (FIG. 1) constructs a flat character recognition database.

Figure 22:
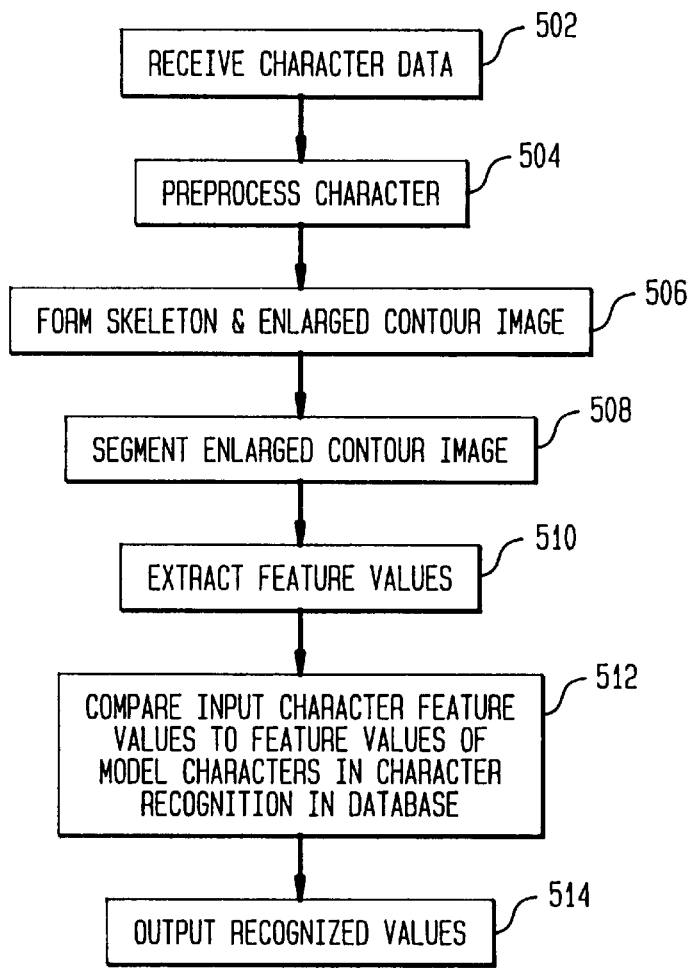
FIG. 22 is a flow chart which schematically illustrates a character recognition process according to an embodiment of the present invention.

Referring to FIG. 22, a character recognition process, e.g., for recognizing handwritten characters on-line, is schematically illustrated. In a first step 502, the character data is received, e.g., using the stylus and tablet 112, interface 114, bus 116 and main memory 118. Then the CPU 122 (FIG. 1) pre-processes the character data in step 504. Next in step 506, the CPU 122 (FIG. 1) forms a skeleton character image and an enlarged contour character image therefrom. In step 508, the CPU 122 (FIG. 1) segments the enlarged contour character image. Illustratively, the CPU 122 (FIG. 1) executes the same segmentation process used in generating the character recognition database described above. (Recall that the segmentation process described above is a variable segmentation process in that the dimensions of the segmented zones depend on the actual distribution of filled pixels in the enlarged contour character image. However, the order in which the character image is segmented vertically and horizontally may be predetermined and identical for both database construction and character recognition.) The CPU 122 (FIG. 1) then extracts feature values from the segmented character image in step 510. Again, the CPU 122 (FIG. 1) illustratively extracts the same feature values described above.

In step 512, the CPU 122 (FIG. 1) determines the best matching model character to the inputted character. To that end, the CPU 122 (FIG. 1) illustratively compares the extracted feature value vector of the inputted character to each mean feature value vector of each class of each model character stored in the character recognition database.

Illustratively, in determining the best matching model character, the CPU 122 (FIG. 1) evaluates the following discriminant function $Dis(A_q, B_r)$:

$$Dis(A_q, B_r) = \sum_{l=1}^{L} \left( \frac{A_{ql} - B_{rl}}{S_l} \right)^2, \qquad (3)$$

where $$S_l = \frac{1}{C} \sum_{c=1}^{C} V_{lc}$$

and where:
q is an index identifying the inputted character,
r and c are independent indexes identifying particular classes and are defined over the range of 1 . . . C
l is an index identifying a particular feature and is defined over the range of 1 . . . L,
L is the total number of features,
C is the total number of classes over the entire database of model characters,
$A_{ql}$ is an $l^{th}$ feature value for the $q^{th}$ input character,
$B_{rl}$ is an $l^{th}$ mean feature value for the $r^{th}$ class,
$A_q$ is the feature value vector of the $q^{th}$ input character including one feature value $(A_{q1}, A_{q2}, \ldots, A_{qL})$ for each feature 1 to L, $B_r$ is the mean feature value vector of the $r^{th}$ class including one mean feature value ($B_{r1}$, $B_{r2}$, ..., $B_{rn}$) for each feature 1 to L, $V_{lc}$ is the standard deviation of the $l^{th}$ feature in a given $c^{th}$ class, and $S_l$ is the mean standard deviation for the $l^{th}$ feature over all C classes.

Advantageously, the mean standard deviation $S_l$ for each $l^{th}$ feature is predetermined and stored during the construction of the database. As a result of these comparisons, the CPU 122 (FIG. 1) recognizes the $q^{th}$ inputted character as the model character z of the $r^{th}$ class having the mean feature value vector $B_r$ that minimizes the output of the above discriminant function $Dis(A_q, B_r)$.

In step 514, the CPU 122 (FIG. 1) outputs an indication as to which model character best matches the $q^{th}$ inputted character. For instance, the CPU 122 (FIG. 1) may output the ASCII code of the model character which best matches the inputted character, or a machine generated image of the model character, or both.

Figure 23:
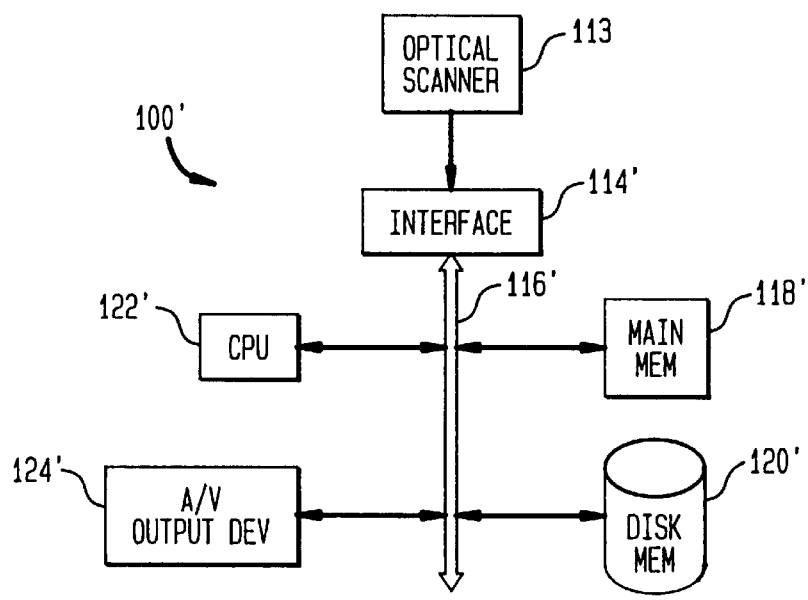
FIG. 23 shows another character recognition apparatus according to an embodiment of the present invention.

Referring to FIG. 23, another embodiment of the inventive character recognition system 100' is shown. The system 100' is similar to the system 100 of FIG. 8 except that an optical scanner 113 is substituted for the stylus and tablet 112 as the character input device. The system 100' is capable of performing off-line handwriting character recognition and machine printed character recognition using similar processes to those shown in FIGS. 9, 20 and 21. In using the system 100' for machine printed character recognition, the character recognition database is constructed by inputting machine printed model character specimens. Furthermore, the segmentation and feature extraction processes may be adjusted for machine printed character recognition. For instance, both the segmentation and feature extraction processes illustrated above assume an upper-right to lower-left slant of the characters which is typical for handwritten characters but may not be for machine printed characters. However, the above classification process is the same.

The above character recognition process can be used for alpha-numeric characters such as the letters of the English alphabet and arabic numbers. The character recognition process can also be used for recognizing other kinds of characters such as Chinese phonetic symbols.

The character process provides a dramatic improvement in character recognition. For instance, experimental analysis shows that the accuracy of a typical character recognition process without classification is about 92.54%. On the other hand, the accuracy of the above character recognition process with classification is about 96.62%. Thus, the number of incorrect recognitions is approximately reduced by ½.

In summary, a character recognition method and system are provided in which the specimens of each model characters are classified into plural classes. As a result, plural mean feature value vectors are provided for each model character which better reflect the non-uniform distribution of the specimens. Thus, mismatches in the recognition process are dramatically reduced.

Finally, the above discussion is intended to merely illustrate the invention. Numerous alternative embodiments may be devised by those having ordinary skill in the art without departing from the spirit and scope of the following claims.

The claimed invention is:

1. A method for recognizing a to-be-recognized character using a character recognition database comprising the step of constructing said character recognition database by performing the steps of:

inputting a plurality of character specimens for each model character to be recognized, for each inputted model character, organizing said specimens into at least one class, wherein the character specimens of at least one model character are organized into plural classes, extracting values of a feature vector, containing plural features, of each of said inputted character specimens, to produce a feature value vector, containing plural feature values, for each of said character specimens, for each of said classes, forming a mean feature value vector, containing plural mean feature values, as an unweighted average of said feature value vectors of said character specimens of said respective classes, storing as said character recognition database said plural mean feature value vectors, including plural mean feature value vectors for said at least one of said model characters for recognizing a to-be-recognized character as a respective model character, and for at least one model character, adjusting said classes of said character specimens to stabilize said classes for character recognition by reassigning one or more character specimens to different classes of said respective model character and repeating said step of forming said mean feature value vectors of said adjusted classes.

2. The method of claim 1 further comprising recognizing a to-be-recognized character as one of said model characters by performing the steps of:

performing said step of extracting on said to-be-recognized character using said same feature vector, comparing said feature value vector of said to-be-recognized character to at least some of said mean feature value vectors of said character recognition database, to determine a best matching feature value vector, and recognizing said to-be-recognized character as the model character corresponding to the class having the best matching mean feature value vector.

3. The method of claim 1 wherein said step of adjusting comprises executing the K_means procedure.

4. The method of claim 1 wherein said step of organizing said specimens further comprises the steps of:

comparing the number of said remaining specimens collected into said new class to a second threshold, and depending on said comparison, adjusting said radius and recollecting, into said new class, each of said remaining specimens within said adjusted radius from said center of said new class.

5. The method of claim 1 wherein said step of determining said center of said new class comprises the step of determining the mean of said feature value vectors of said remaining character specimens.

6. The method of claim 5 wherein said radius determined in said step of determining a radius is a function of the standard deviation of said features of said remaining character specimens.

7. The method of claim 1 further comprising the step of segmenting an image of each of said inputted character specimens into a plurality of zones.

8. The method of claim 7 wherein said step of segmenting produces a plurality of segmented character images for each of said inputted character specimens.

9. The method of claim 7 wherein said step of extracting further the step of:

extracting said feature values from particular zones of particular ones of said segmented character images of each of said character specimens according to a predetermined scheme.

10. The method of claim 7 wherein said image is segmented into variable dimensioned zones.

11. The method of claim 7 wherein said step of determining a feature value vector comprises the step of extracting stroke density function feature values by projecting a plurality of inspection lines across one of said zones of a character specimen, counting the total number of times said inspection lines cross said zone and dividing the total number of times said inspection lines cross said zone by the number of inspection lines projected in said step of projecting.

12. The method of claim 7 wherein said step of determining a feature value vector comprises the step of extracting peripheral background area feature values by evaluating $$PBA = \sum_{n=1}^{N} \frac{\lambda_n}{X_m \cdot Y_m} \qquad (5)$$

where:
- m is an index of said zones into which said image of said character specimen is segmented,
- n is an index of points on an axis relative to an $m^{th}$ one of said zones which takes on each value from 1 to N,
- N is a maximum dimension on said axis,
- $\lambda_n$ is a distance from an $n^{th}$ one of said points on said axis to a filled pixel of said $m^{th}$ zone in pixels,
- $X_m$ is a horizontal width of said $m^{th}$ zone, and
- $Y_m$ is a vertical height of the $m^{th}$ zone.

13. The method of claim 7 wherein said step of determining a feature value vector comprises the step of extracting contour line length features values by evaluating:

$$\Delta\lambda_n = \lambda_{n+1} - \lambda_n \qquad (6)$$

$$CLL_1 = \sum_{n=1}^{N} \frac{\Delta\lambda_n}{X_m + Y_m}, \text{ for each } \Delta\lambda_n < 0$$

$$CLL_2 = \sum_{n=1}^{N} \frac{\Delta\lambda_n}{X_m + Y_m}, \text{ for each } \Delta\lambda_n > 0$$

where
- m is an index of said zones into which said image of said character specimen is segmented,
- n is an index of points on an axis to an $m^{th}$ one of said zones, which successively takes on each value from 1 to N,
- N is a maximum dimension on said axis,
- $\lambda_n$ is the distance in pixels from an $n^{th}$ one of said points on said axis to a filled pixel of said $m^{th}$ zone in pixels,
- $X_m$ is a horizontal width of said $m^{th}$ zone, and
- $Y_m$ is a vertical height of said $m^{th}$ zone.

14. The method of claim 7 wherein said step of determining a feature value vector comprises the step of extracting gradient feature values by evaluating $$Len = \sqrt{X^2 + Y^2} \qquad (7a)$$

$$(Dir_{i,j} - 1) \cdot \frac{\pi}{8} \leq \tan^{-1}\left(\frac{Y}{X}\right) < (Dir_{i,j} + 1) \cdot \frac{\pi}{8} \qquad (7b)$$

$$\sum_{i=1}^{I} \sum_{j=1}^{J} \frac{Len_{i,j}(Dir_{i,j})}{Bdd_m(Dir_{i,j})} \text{ for each } Dir_{i,j} \qquad (7c)$$

where:
- m is an index of said zones into which said image of a character specimen is divided,
- i is a column index of an $m^{th}$ one of said zones,
- j is a row index of said $m^{th}$ zone,
- $Len_{ij}$ is a vector of values Len, including one value for each direction code ($Dir_{ij}$) generated using equation (7a), for a pixel in said $i^{th}$ column and $j^{th}$ row of said $m^{th}$ zone,
- $(Dir_{ij})$ is a direction code of a pixel in an $i^{th}$ column and $j^{th}$ row of said $m^{th}$ zone,
- $Bdd_m (Dir_{ij})$ represents the boundary width of said m-th zone in a direction normal to a direction specified by $(Dir_{ij})$, and
- X and Y are values generated using the following kernels;

| -1 | 0 | 1 |   | 1 | 1 | 1 |
|----|---|---|---|---|---|---|
| -1 | * | 1 |   | 0 | * | 0 |
| -1 | 0 | 1 |   | -1 | -1 | -1 |

X          Y                                    (7d)

15. The method of claim 2 wherein said step of comparing comprises the step of evaluating a discriminant function:

$$Dis(A_q, B_r) = \sum_{l=1}^{L} \left( \frac{A_{ql} - B_{rl}}{S_l} \right)^2,$$

where $$S_l = \frac{1}{C} \sum_{c=1}^{C} V_{lc}$$

and where:
- q is an index identifying the inputted character,
- r and c are independent indexes identifying particular classes and are defined over the range of 1 . . . C
- l is an index identifying a particular feature and is defined over the range of 1 . . . L,
- L is the total number of features,
- C is the total number of classes over the entire database of model characters,
- $A_{ql}$ is an $l^{th}$ feature value for the $q^{th}$ input character,
- $B_{rl}$ is an $l^{th}$ mean feature value for the $r^{th}$ class,
- $A_q$ is the feature value vector of the $q^{th}$ input character including one feature value ($A_{q1}, A_{q2}, \ldots, A_{qL}$) for each feature 1 to L,
- $B_r$ is the mean feature value vector of the $r^{th}$ class including one mean feature value $B_{r1}, B_{r2}, \ldots, B_{rm}$) for each feature 1 to L,
- $V_{lc}$ is the standard deviation of the $l^{th}$ feature in a given $c^{th}$ class, and
- $S_l$ is the mean standard deviation for the $l^{th}$ feature over all C classes.

16. The method of claim 15 wherein said $q^{th}$ inputted character is recognized as a model character corresponding to an $r^{th}$ class for particular values of q and r which minimize Dis ($A_q$, $B_r$).

17. The method of claim 1 wherein said character recognition database includes model phonetic symbols.

18. The method of claim 1 wherein said character recognition database includes alpha-numeric characters.

19. The method of claim 1 wherein said inputted characters are inputted on-line.

20. The method of claim 1 wherein said inputted characters are inputted off-line.

21. The method of claim 19 wherein said inputted characters are handwritten characters.

22. The method of claim 1 wherein said inputted characters are machine printed characters.

23. A system for recognizing a to-be-recognized character using a character recognition database comprising:

a character input device for electronically receiving a plurality of inputted character specimens for each model character to be recognized in constructing a database and a processor connected to said character input device for electronically constructing a database by electronically organizing said c specimens into a plurality of classes wherein the character specimens of at least one model character are organized into plural classes said processor also for electronically extracting values of a feature vector, containing plural features, of each of said inputted character specimens, to produce a feature value vector, containing plural feature values, for each of said character specimens, for each of said classes, forming a mean feature value vector, containing plural mean feature values, as an unweighted average of said feature value vectors of said character specimens of said respective classes, and storing as said character recognition database said plural mean feature value vectors, including plural mean feature value vectors for said at least one of said model characters for recognizing a to-be-recognized character as a respective model character, and for at least one model character, adjusting said classes of said character specimens to stabilize said classes for character recognition by reassigning one or more character specimens to different classes of said respective model character and repeating said step of forming said mean feature value vectors of said adjusted classes.

24. The character recognition system of claim 23 wherein said character input device electronically receives a to-be-recognized character, and wherein said processor is also for extracting values of said same feature vector from said to-be-recognized character to produce a feature value vector for said to-be-recognized character, comparing said feature value vector of said to-be-recognized character to at least some of said mean feature value vectors of said character recognition database, to determine a best matching feature value vector, and recognizing said to-be-recognized character as the model character corresponding to the class having the best matching mean feature value vector.

25. The system of claim 23 further comprising a memory for electronically storing said character recognition database.

26. The system of claim 23 wherein said character input device is a stylus and tablet.

27. The system of claim 23 wherein said character input device is an optical scanner.

* * * * *